United States Patent Office 3,252,963
Patented May 24, 1966

3,252,963
COBALT- AND CHROMIUM-COMPLEX AZO DYE-
STUFFS FREE FROM SULFONIC AND CARBOX-
YLIC ACID GROUPS, AND CARRYING AN
ACRYLOYLAMINO RADICAL
Alexander Blackhall and Gerald Booth, Manchester, England, assignors to Imperial Chemical Industries Limited, London, England, a corporation of Great Britain
No Drawing. Filed Nov. 20, 1962, Ser. No. 239,050
Claims priority, application Great Britain, June 12, 1959, 20,170/59; Aug. 24, 1959, 28,917/59
7 Claims. (Cl. 260—147)

This application is a continuation-in-part application of our application Serial No. 33,384, filed on June 2, 1960, which is now abandoned.

This invention relates to azo dyestuffs and more particularly it relates to metal-containing azo dyestuffs comprising the 1:2-chromium and 1:2-cobalt complexes of monoazo dyestuffs, which are valuable for colouring nitrogen-containing textile materials.

According to the invention there are provided the metal-containing azo dyestuffs of the formula:

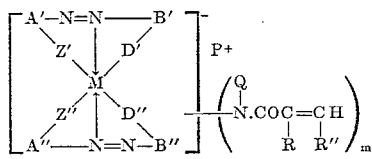

wherein $A'$ and $A''$ are arylene radicals independently selected from the class consisting of phenylene and naphthylene radicals;

$Z'$ and $Z''$, which are attached to the arylene radicals $A'$ and $A''$ respectively in ortho position to the azo groups, are independently selected from the class consisting of —O— and —COO—;

$B'$ and $B''$ are the residues of coupling components independently selected from the class consisting of residues of coupling components of the phenol, naphthol, acylacetarylamide, 5-aminopyrazole, 5-pyrazolone, 2:4-dihydroxyquinoline and arylamine series;

$D'$ and $D''$, which are attached to the residues of the coupling components $B'$ and $B''$ respectively in an adjacent position to the azo groups, are independently selected from the class consisting of —O— and —NH—;

M is a metal atom selected from the class consisting of cobalt and chromium atoms;

P is a cation;

Q is selected from the class consisting of hydrogen and lower alkyl;

$R'$ and $R''$ are independenly selected from the class consisting of hydrogen and chlorine atoms;

$m$ is a positive integer not exceeding 4;

And each of the

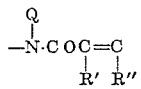

groups is directly attached to a carbon atom of an aryl ring present in $A'$, $A''$, $B'$ and $B''$ which are free from sulphonic acid and carboxylic acid groups.

As examples of the cations represented by P there may be mentioned hydrogen, sodium, potassium and ammonium cations.

As examples of the lower alkyl radicals represented by Q there may be mentioned alkyl radicals containing at most 4 carbon atoms such as methyl, ethyl, propyl and butyl radicals. It is however preferred that Q represents a hydrogen atom.

It is also preferred that $R'$ and $R''$ each represent a hydrogen atom; so that the

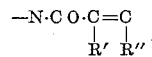

group preferably represents a —NHCOCH=CH$_2$ group. Although the metal-containing azo dyestuffs can contain from 1 to 4

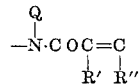

groups it is preferred that the dyestuffs contain an even number of such groups; for example that the dyestuffs contain 4, or, preferably, 2 such groups.

The residues of the coupling components represented by $B'$ and $B''$ are the residues of coupling components of the phenol, naphthol, acylacetarylamide, 2:4-dihydroxyquinoline or 5-pyrazolone series which couple in ortho or adjacent position to a hydroxy or enolisable keto group, or the residues of coupling components of the arylamine or 5-aminopyrazole series which couple in ortho or adjacent position to a primary amino group. The residues of the coupling components of the acylacetarylamide series are preferably the residues of coupling components of the acetoacetanilide series. The residues of the coupling components of the arylamine series are preferably the residues of coupling components of the naphthylamine series. The residues of the coupling components of the 5-pyrazolone and 5-aminopyrazole series are preferably the residues of coupling components of the 5-pyrazolone and 5-aminopyrazole series which contain an aryl ring, which is preferably a phenyl or napthyl ring, attached to the 1-position of the pyrazole ring, and which contain a lower alkyl radical in particular the methyl radical, a carbolower alkoxy group or a carbonamido group attached to the 3-position of the pyrazole ring.

In addition to the

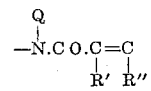

groups which are attached to carbon atoms of aryl rings present in $A'$, $A''$, $B'$ and $B''$, the phenylene or naphthylene radicals represented by $A'$ and $A''$ and any phenyl or naphthyl radicals present in $B'$ and $B''$ can contain additional substituents, other than carboxylic acid and sulphonic acid groups. As examples of such substituents there may be mentioned chlorine, or bromine atoms, lower alkyl radicals in particular methyl, ethyl and tert-butyl radicals, lower alkoxy radicals in particular the methoxy radical, nitro, acetyl, cyano or phenylsulphone groups, lower alkylsulphone groups such as methylsulphone, ethylsulphone and propylsulphone groups, hydroxy lower alkyl sulphone groups in particular the β-hydroxyethylsulphone group, acylamino groups such as acetylamino, propionylamino, benzoylamino, benzenesulphonylamino, p - toluenesulphonylamino, carbomethoxyamino, carboethoxyamino and carbopropoxyamino groups, sulphamyl groups and substituted sulphamyl groups such as N-(lower alkyl)sulphamyl and N:N-di-(lower alkyl) sulphamyl groups, in particular N-methylsulphamyl, N-ethylsulphamyl, N-propylsulphamyl, N:N-dimethylsulphamyl, N:N-diethylsulphamyl and N:N-dipropylsulphamyl groups, N-(hydroxylower alkyl)sulphamyl and N:N-di(hydroxy lower alkyl) sulphamyl groups in particular N-(β-hydroxyethyl)sulphamyl and N:N-di(β-hydroxyethyl)sulphamyl groups, and N-phenylsulphamyl and sulphomorpholyl groups.

Of the said substituents present in the metal-containing azo dyestuffs not more than 4 of the said substituents shall be lower alkylsulphonyl, sulphamyl or sulphamyl substituted in the nitrogen atom by one or two substituted or unsubstituted lower alkyl groups.

The metal-containing azo dyestuffs of the invention, which are the 1:2-chromium or cobalt complexes of monoazo compounds, that is to say the complexes of one atom of chromium or cobalt with two molecular proportions of one or two different monoazo compounds of the formula:

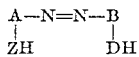

wherein A, B, D and Z have the meanings stated below, the said complexes containing from one to four

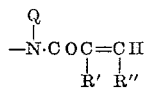

groups as hereinbefore defined, may be obtained by treating a metallisable azo compound of the formula:

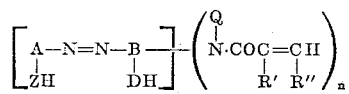

Formula I wherein A is a phenylene or naphthylene radical, Z represents —O— or —COO— and the group —ZH is attached to A in ortho position to the azo group, B represents the residue of a coupling component of the phenol, naphthol, acylacetarylamide, 5-aminopyrazole, 2:4-dihydroxyquinoline, arylamine or 5-pyrazolone series which couples in ortho or adjacent position to an amino, hydroxy or enolised keto group, D represents —NH— or —O—, and the group represented by —DH is attached to B in ortho or adjacent position to the azo group, $n$ represents 1 or 2, and Q, R' and R" have the meanings stated, or a mixture of a metallisable azo compound of the above Formula I and a different metallisable azo compound of the above Formula I or a metallisable azo compound of the above Formula I except that $n$ represents 0, under mildly acid, neutral or alkaline conditions with a metallisable agent yielding chromium or cobalt respectively in such amounts that correspond to more than 0.5 atomic proportions and are preferably between 0.5 and 0.7 atomic proportions of chromium or cobalt for each molecular proportion of the said metallisable azo compound.

The radicals represented by A may be substituted as previously state for A' or A" and the residue of the coupling component represented by B has the definition given for B' or B".

As examples of metallising agents yielding chromium or cobalt there may be mentioned chromium or cobalt halides, for example the chlorides or fluorides, chromium or cobalt salts of aliphatic carboxylic acids, for example of formic or acetic acid, mixtures of chromium or cobalt salts with alkali metal salts of aliphatic hydroxy-carboxylic acids such as tartaric acid, and chromium complexes of aromatic orthohydroxy carboxylic acids such as salicylic acid.

The treatment of the said metallisable azo compound or compounds, as hereinbefore defined, with the agent yielding chromium or cobalt is carried out under mildly acid, neutral, or alkaline conditions, preferably at elevated temperatures. The treatment is usually carried out in aqueous medium, preferably in the presence of a water-soluble organic liquid such as ethanol, n-butanol, β-ethoxyethanol, ethylene glycol or acetic acid. At the completion of the treatment the metal-containing azo dyestuffs is isolated, if necessary after adding sodium chloride, and if desired can be purified by reprecipitating it from an aqueous solution.

The metallisable azo compounds of Formula I may themselves be obtained by diazotising an amine of the formula

wherein A and Z have the meanings stated above and the —ZH group is attached to A in ortho position to the amino group, and coupling the diazo compound so obtained with a coupling component of the phenol, napthol, acylacetarylamide, 5-aminopyrazole, arylamine, 2:4-dihydroxyquinoline or 5-pyrazolone series, wherein the amine and the coupling component together contain one or two

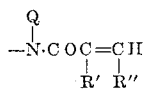

groups, as hereinbefore defined; or in the cases wherein a mixture of metallisable azo compounds is used and one of the said metallisable azo compounds is free from

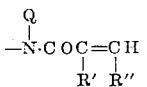

groups, using amines and coupling components which are free from such groups.

As specific examples of the amines of the formula:

there may be mentioned 2-aminophenol,
4-methyl-2-aminophenol,
4-methoxy-2-aminophenol,
4-, 5- or 6-chloro-2-aminophenol,
4-, 5- or 6-nitro-2-aminophenol,
4:6-dinitro-2-aminophenol,
4-chloro-5-nitro-2-aminophenol,
3-bromo-5-nitro-2-aminophenol,
6-nitro-4-cyano-2-aminophenol,
2-aminophenol-4-methylsulphone,
2-aminophenol-4-ethylsulphone,
2-aminophenol-4-n-propylsulphone,
2-aminophenol-4-phenylsulphone,
4-acetylamino-2-aminophenol,
4-acryloylamino-2-aminophenol,
4-(N-methyl-N-acryloylamino)-2-aminophenol,
Anthranilic acid,
4- or 5-chloroanthranilic acid,
4- or 5-nitroanthranilic acid,
4- or 5-acetylaminoanthranilic acid,
4- or 5-benzoylaminoanthranilic acid,
anthranilic acid-4-methylsulphone,
4- or 5-acryloylaminoanthranilic acid,
2-aminophenol-4- or 5-sulphonamide,
4-chloro-2-aminophenol-5- or 6-sulphonamide,
6-nitro-2-aminophenol-4-sulphonamide,
1-amino-2-naphthol-4-sulphonamide,
6-nitro-1-amino-2-naphthol-4-sulphonamide,
2-aminophenol-4- or 5-sulphonmethylamide,
2-aminophenol-4-sulphonmorpholide,
2-aminophenol-4- or 5-sulphonethylamide,
2-aminophenol-4- or 5-sulphonpropylamide,
2-aminophenol-4- or 5-sulphon-N:N-di(β-hydroxyethyl)-amide,
2-aminophenol-4- or 5-sulphonanilide,
2-aminophenol-4-β-hydroxyethylsulphone,
2-aminophenol-4- or 5-sulphondimethylamide,
2-aminophenol-4- or 5-sulphondiethylamide,
2-aminophenol-4-sulphon-N-acetylamide,
2-aminophenol-4-sulphon-N-benzoylamide,
2-aminophenol-4-sulphon-N-(benzenesulphonyl)amide,
2-aminophenol-4-sulphon-N-(p-toluenesulphonyl)amide, 5-nitro-2-aminophenol-4-methylsulphone,
2-aminophenol-4:6-di(methylsulphone),
6-nitro-2-aminophenol-4-methylsulphone,
4-nitro-2-aminophenol-6-sulphonamide,
6-chloro-2-aminophenol-4-sulphonamide,
6-nitro-2-aminophenol-4-sulphondimethylamide,
4-chloro-2-aminophenol-6-sulphondimethylamide,
anthranilic acid-4-sulphonamide,
6-nitro-2-amino-4-tert-butylphenol and
5-nitro-4-methyl-2-aminophenol.

As examples of coupling components of the acylacetarylamide series there may be mentioned
Acetoacetanilide,
acetoacet-2-, 3- or 4-methylanilide,
acetoacet-2-, 3- or 4-methoxyanilide,
Acetoacet-2:5-dimethoxyanilide,
Acetoacet-2-, 3- or 4-chloroanilide,
Acetoacetanilide-3- or 4-sulphonamide,
3- or 4-acryloylaminoacetoacetahilide,
Acetoacet-4-(acetylamino)anilide and
Acetoacet-2-methoxy-5-methylanilide.

As examples of coupling components of the 5-pyrazolone series there may be mentioned 3-methyl-5-pyrazolone or 1:3-dimethyl-5-pyrazolone but more especially 1-aryl-5-pyrazolones and aryl substituted derivatives thereof such as 1-phenyl-3-methyl-5-pyrazolone,
1-(2'- or 3'- or 4'-methylphenyl)-3-methyl-5-pyrazolone,
1-(2'-, 3'- or 4'-methoxyphenyl)-3-methyl-5-pyrazolone,
1-(2', 3' or 4'-nitrophenyl)-3-methyl-5-pyrazolone,
1-(2'-, 3'- or 4'-chlorophenyl)-3-methyl-5-pyrazolone,
1-(2':5'-dichlorophenyl)-3-methyl-5-pyrazolone,
1-[3'- or 4'-(acetylamino)phenyl]-3-methyl-5-pyrazolone,
1-[2'-, 3'- or 4'-(acryloylamino)phenyl]-3-methyl-5-pyrazolone,
1-[2'-methyl-5'-(acryloylamino)phenyl]-3-methyl-5-pyrazolone,
1-(3'- or 4'-sulphamylphenyl)-3-methyl-5-pyrazolone,
1-[3'- or 4'-(N-methylsulphamyl)phenyl]-3-methyl-5-pyrazolone,
1-[3'- or 4'-(N-ethylsulphamyl)phenyl-3-methyl-5-pyrazolone,
1-(naphth-1'-yl)-3-methyl-5-pyrazolone,
1-(naphth-2'-yl)-3-methyl-5-pyrazolone,
1-(4'-, 5'-, 6'- or 7'-sulphamylnaphth-1'-yl)-3-methyl-5-pyrazolone,
1-(6'- or 8'-sulphamylnaphth-2'-yl)-3-methyl-5-pyrazolone,
1-[3'- or 4'-(N-$\beta$-hydroxyethylsulphamyl)phenyl]-3-methyl-5-pyrazolone,
1-[3'-(N-p-toluenesulphonylsulphamyl)phenyl]-3-methyl-5-pyrazolone,
1-[3'-(N:N-dimethylsulphamyl)phenyl]-3-methyl-5-pyrazolone,
1-[3'-(N:N-diethylsulphamyl)phenyl]-3-methyl-5-pyrazolone,
1-phenyl-5-pyrazolone-3-carboxyanilide,
1-phenyl-5-pyrazolone-3-carboxy-(2'-, 3'- or 4'-methyl)-anilide,
1-phenyl-5-pyrazolone-3-carboxy-(2'-methoxy-5'-methyl)-anilide,
1-phenyl-5-pyrazolone-3-carboxy-(2'-, 3'- or 4'-chloro)-anilide,
1-phenyl-3-carbomethoxy-5-pyrazolone,
1-phenyl-3-carboethoxy-5-pyrazolone and
1-[2'-, 3'- or 4'-($\alpha$-chloroacryloylamino)-phenyl]-3-methyl-5-pyrazolone.

As examples of coupling components of the phenol series there may be mentioned p-cresol, 3:4-dimethylphenol, 2-acryloylamino-4-methylphenol, 3-acryloylamino-4-methylphenol, 4-tert-butylphenol, 2- or 3-carboethoxyamino-4-methylphenol, 2:4-dichlorophenol and 2- or 3-acetylamino-4-methylphenol.

As examples of coupling components of the naphthol series there may be mentioned 2-naphthol,
6-bromo-2-naphthol,
2-naphthol-6-sulphonamide,
2-naphthol-6-sulphon-N-methylamide,
2-naphthol-6-sulphon-N:N-dimethylamide,
2-naphthol-6-sulphonanilide,
4-acetyl-1-naphthol,
4-acetylamino-1-naphthol,
4-acryloylamino-1-naphthol,
1-naphthol-4- or 5-sulphonamide,
1-acryloylamino-6-naphthol,
1-acetylamino-6-naphthol,
2-acryloylamino-6-naphthol,
2-acryloylamino-7-naphthol,
1-acryloylamino-7-naphthol,
1-($\alpha$-chloroacryloylamino)-7-naphthol,
1-acetylamino-7-naphthol,
1-propionylamino-7-naphthol,
1-benzoylamino-7-naphthol,
1-benzenesulphonylamino-7-naphthol,
1-carbomethoxyamino-7-naphthol,
1-carboethoxyamino-7-naphthol,
1-carbopropoxyamino-7-naphthol,
5-chloro-1-naphthol,
5:8-dichloro-1-naphthol,
4-methoxy-1-naphthol,
4-ethoxy-1-naphthol,
1-naphthol-3-sulphonamide,
6-acetyl-2-naphthol and
1-naphthol-3:8-disulphonamide.

As examples of coupling components of the 5-aminopyrazole series there may be mentioned 1-phenyl-3-methyl-5-aminopyrazole.

As examples of coupling components of the 2:4-dihydroxyquinoline series there may be mentioned 2:4-dihydroxyquinoline.

As examples of coupling components of the arylamine series there may be mentioned 2-naphthylamine and 2-naphthylamine-6-sulphonamide.

Alternatively the metal-containing azo dyestuffs of the invention may be obtained by treating a metal-containing azo compound of the formula

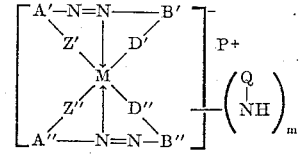

Formula II wherein A', A", B', B", D', D", Z', Z", M, P, Q and $m$ have the meanings stated, with an acylating agent derived from an acid of the formula:

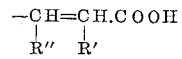

wherein R' and R" have the meanings stated.

This reaction may be conveniently carried out by adding the acylating agent to the metal-containing azo compound in water or in a water-miscible organic liquid or in a mixture of water and a water-miscible organic liquid, stirring the resulting mixture whilst preferably adding an acid-binding agent, such as sodium carbonate or sodium acetate, to maintain the mixture neutral, adding sodium chloride and filtering off the dyestuff which is precipitated.

The acylating agents may be either anhydrides, or preferably acid halides of the said acid, and as specific examples of the said acylating agents there may be mentioned $\alpha$-chloroacryloyl chloride, $\beta$-chloroacryloyl chloride, α:β-dichloroacryloyl chloride and, above all, acryloyl chloride.

The metal-containing azo compounds of the above Formula II may themselves be obtained by treating one or two different azo compounds of the formula:

$$A-N=N-B$$
$$\overset{|}{ZH} \quad \overset{|}{HD}$$

wherein A, B, D and Z have the meanings stated, and the said azo compound or compounds together contain from 1 to 4

$$\overset{Q}{\underset{|}{-NH}}$$

groups, wherein Q has the meaning stated, or from 1 to 4 groups, such as nitro or acetylamino groups, which can subsequently be converted to the said $$\overset{Q}{\underset{|}{-NH}}$$

groups, with a metallising agent yielding chromium or cobalt under such conditions that a 1:2-chromium or 1:2-cobalt complex of the azo compound or compounds is obtained, and finally converting the 1 to 4 groups to $$\overset{Q}{\underset{|}{-NH}}$$

groups.

Alternatively the metal-containing azo dyestuffs of the invention wherein M represents a chromium atom may be obtained by reacting together an azo compound of the formula:

$$\left[ \begin{matrix} A-N=N-B \\ \overset{|}{ZH} \quad \overset{|}{DH} \end{matrix} \right] - \left( \begin{matrix} Q \\ \overset{|}{N.COC=CH} \\ \overset{|}{R'} \overset{|}{R''} \end{matrix} \right)_x \quad \text{Formula III}$$

wherein A, B, D, Z, R', R'' and Q have the meanings stated, and x is 0, 1 or 2, and a 1:1-chromium complex of an azo compound of Formula III, provided that the two reactants together contain from 1 to 4

$$\overset{Q}{\underset{|}{-N.COC=CH}}$$
$$\overset{|}{R'} \overset{|}{R''}$$

groups.

This reaction may be conveniently carried out by heating the two reactants together in aqueous medium or in a mixture of water and a water-miscible organic liquid such as ethanol, β-ethoxyethanol or dioxan, under neutral or weakly alkaline conditions. At the conclusion of the reaction the 1:2 chromium complex may be isolated from the reaction mixture by adding sodium chloride and filtering off the precipitated solid.

The 1:1-chromium complexes of the azo compounds of Formula III may themselves be obtained by treating an azo compound of Formula III with a chromium salt such as chromium chloride or chromium formate by known methods.

One preferred class of the metal-containing azo dyestuffs of the invention are the metal-containing azo dyestuffs which are represented by the formula:

$$\left[ \begin{matrix} A'-N=N-B' \\ Z' \diagdown \overset{|}{\underset{M}{D'}} \\ Z' \diagup \overset{|}{\underset{A'-N=N-B'}{D'}} \end{matrix} \right]^{P+} \left( \begin{matrix} Q \\ \overset{|}{N.COC=CH} \\ \overset{|}{R'} \overset{|}{R''} \end{matrix} \right)_p$$

wherein A', B', D', M, P, Z', Q, R' and R'' have the meanings stated and p represents an integer selected from 2 and 4.

A second preferred class of the metal-containing azo dyestuffs of the invention are the 1:2-chromium and 1:2-cobalt complexes of the monoazo compounds of the formula:

[structure with L substituents and NHCOCH=CH₂ group on naphthalene]

wherein one L represents a hydroxy group and the other L represents a radical of the formula:

[benzene ring with $(CO)_{r-1}OH$ and $-N=N-$ substituents]

wherein r is a positive integer not exceeding 2, and any substitutents on the benzene ring are selected from the class consisting of chlorine, nitro, lower alkyl, lower alkoxy, lower alkylsulphonyl, hydroxy lower alkylsulphonyl, sulphamyl, N-(lower alkyl)sulphamyl, N:N-di(lower alkyl)sulphamyl, N-(hydroxy lower alkyl)sulphamyl and N:N-di(hydroxy lower alkyl)sulphamyl.

A third preferred class of the metal-containing azo dyestuffs of the invention are the 1:2-chromium and 1:2-cobalt complexes of the monoazo compounds of the formula:

[structure: phenol-N=N-naphthol with NHCOCH=CH₂]

and any substitutents on the benzene ring are selected from the class consisting of chlorine, nitro, lower alkyl, lower alkoxy, lower alkylsulphonyl, hydroxy lower alkylsulphonyl, sulphamyl, N-(lower alkyl)sulphamyl, N:N-di(lower alkyl)sulphamyl, N-(hydroxy lower alkyl)sulphamyl and N:N-di(hydroxy lower alkyl) sulphamyl.

A fourth preferred class of the metal-containing azo dyestuffs of the invention are the 1:2-chromium and 1:2-cobalt complexes of the monoazo compounds of the formula:

[structure: phenol-N=N-naphthol with NHCOCH=CH₂]

and any substituents on the benzene ring are selected from the class consisting of chlorine, nitro, lower alkyl, lower alkoxy, lower alkylsulphonyl, hydroxy lower alkylsulphonyl, sulphamyl, N-(lower alkyl) sulphamyl, N:N-di(lower alkyl) sulphamyl, N-(hydroxy lower alkyl) sulphamyl and N:N-di(hydroxy lower alkyl) sulphamyl.

A fifth preferred class of the metal-containing azo dyestuffs of the invention are the 1:2-chromium and cobalt complexes of the monoazo compounds of the formula:

[structure with ring I, $(CO)_{r-1}OH$, pyrazolone ring, and V substituents]

wherein r represents a positive integer not exceeding 2, one V represents a hydrogen atom and the other V represents a —NHCOCH=CH₂ group, and any substituents on the benzene ring I are selected from the class consisting of chlorine, nitro, lower alkyl, lower alkoxy, lower alkylsulphonyl, hydroxylower alkylsulphonyl, sulphamyl, N-(lower alkyl)sulphamyl, N:N-di(lower alkyl)-sulphamyl, N-(hydroxy lower alkyl)sulphamyl and N:N-di(hydroxy lower alkyl)sulphamyl.

A sixth preferred class of the metal-containing azo dyestuffs of the invention are the 1:2-chromium and cobalt complexes of the monoazo compounds of the formula:

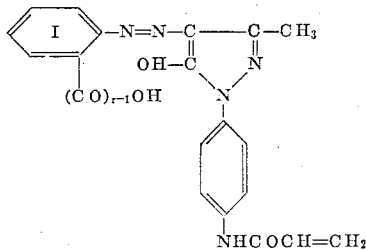

wherein $r$ represents a positive integer not exceeding 2, and any substituents on the benzene ring I are selected from the class consisting of chlorine, nitro, lower alkyl, lower alkoxy, lower alkylsulphonyl, hydroxy lower alkylsulphonyl, sulphamyl, N-(lower alkyl)sulphamyl, N:N-di(lower alkyl) sulphamyl, N-(hydroxy lower alkyl) sulphamyl, and N:N-di(hydroxy lower alkyl) sulphamyl.

The metal-containing azo dyestuffs, as hereinbefore defined, are of particular value for colouring nitrogen-containing textile materials for example textile materials comprising natural and regenerated protein fibres such as wool and silk, textile materials comprising synthetic nitrogen-containing fibres for example polyamide fibres such as fibres of polyhexamethyleneadipamide and the polymer of caprolactam, polyurethane fibres and polyacrylonitrile fibres especially modified polyacrylonitrile fibres. The new metallised dyestuffs can also be used for colouring leather.

The metal-containing azo dyestuffs, as hereinbefore defined, can be applied to the textile materials by either a dyeing or a printing process. For dyeing nitrogen-containing textile materials such as wool the metal-containing azo dyestuffs are preferably applied to the said textile materials from a neutral, acid or slightly alkaline dyebath, preferably at temperatures between 75° and 120° C. The dyebath can be maintained at a constant or substantially constant pH, or if desired the pH of the dyebath can be altered at any stage of the dyeing process by the addition of acids or alkalis. If desired the dyebaths may also contain substances which are commonly added when dyeing nitrogen-containing textile materials such as wool, for example sodium sulphate, ammonium sulphate, acetic acid and formic acid. There may also be present in the dyebath anionic surface-active agents such as the disodium salt of methylene dinaphthalene sulphonic acid, non-ionic dispersing agents for example condensates of ethylene oxide with amines, fatty alcohols or alkylated phenols, and surface-active cationic agents for example quaternary ammonium salts, such as cetyl trimethylammonium bromide, cetyl pyridinium bromide and stearamidomethyl pyridinium chloride. If it is desired to dye the nitrogen-containing textile materials at temperatures below 75° C., for example at temperatures between 40° and 75° C. then it is preferred to add a water-soluble organic liquid, for example a water-soluble alcohol, such as butanol or benzyl alcohol, to the dyebath.

Some of the metal-containing azo dyestuffs of the invention have little or no solubility in water and in such cases it is preferred to use the dyestuffs in the form of an aqueous dispersion which may be obtained by milling the dyestuffs with water in the presence of a dispersing agent such as the disodium salt of methylene dinaphthalene sulphonic acid.

The metal-containing azo dyestuffs of the invention have excellent affinity for nitrogen-containing textile materials, especially woollen textile materials, and the colourations so produced have excellent fastness to light and to wet treatments such as washing and in particular to milling and to potting, and to neutral or acid cross dyeing. The metal-containing azo dyestuffs of the invention give dyeings on wool which have superior fastness to washing tests such as potting, neutral cross dyeing and acid cross dyeing than dyeings similarly obtained from the corresponding dyestuffs which contain one or more sulphonic acid or carboxylic acid groups. The metal-containing azo dyestuffs of the invention are also superior to the corresponding dyestuffs which contain one or more sulphonic acid or carboxylic acid groups in respect of level dyeing properties and neutral dyeing affinity for wool.

The invention is illustrated but not limited by the following examples in which the parts and percentages are by weight.

*Example 1*

A mixture of 4.12 parts of the monoazo compound obtained by coupling diazotised 2-aminophenol-4-sulphonamide with 1-acryloylamino-7-naphthol in alkaline medium, 1.36 parts of chromium acetate, 80 parts of ethanol and 100 parts of water is stirred at the boil under a reflux condenser for 1½ hours. 10 parts of an aqueous solution of sodium potassium chromosalicylate (which is obtained as described in Example 2 of British specification No. 787,305) are then added and the mixture is stirred at the boil for a further 3½ hours. The mixture is then filtered and the filtrate so obtained poured into 500 parts of a 20% aqueous solution of sodium chloride. The precipitated dyestuff is then filtered off, washed with a 5% aqueous solution of sodium chloride and dried.

When applied to wool from a neutral or slightly acid dyebath, the dyestuff, which is the 1:2-chromium complex of 1-acryloylamino-8-(5'-sulphamyl-2'-hydroxyphenylazo)-7-naphthol, yields reddish-grey shades possessing excellent fastness to wet treatments and to light.

*Example 2*

A mixture of 4.12 parts of the monoazo compound obtained by coupling diazotised 2-aminophenol-5-sulphonamide with 2-acryloylamino-7-naphthol in alkaline medium, 1.56 parts of chromium acetate, 90 parts of β-ethoxyethanol and 100 parts of water is stirred at the boil under a reflux condenser for 1 hour. 10 parts of an aqueous solution of sodium potassium chromosalicylate are then added and the mixture is stirred at the boil for a further 2½ hours. The mixture is then filtered and the filtrate so obtained is poured into 350 parts of a saturated aqueous solution of sodium chloride. The precipitated dyestuff is then filtered off, washed with a 5% aqueous solution of sodium chloride and dried.

When applied to wool from a neutral or slightly acid dyebath the dyestuff, which is the 1:2-chromium complex of 2-acryloylamino-8-(4'-sulphamyl-2'-hydroxyphenylazo)-7-naphthol, yields violet shades possessing excellent fastness to wet treatments and to light.

*Example 3*

A mixture of 4.59 parts of the monoazo compound obtained by coupling diazotised 2-aminophenol-4-ethylsulphone with 1-(α-chloroacryloylamino)-7-naphthol in alkaline medium, 1.98 parts of chromium acetate, 80 parts of ethanol and 100 parts of water is stirred at the boil under a reflux condenser for 1¾ hours. The mixture is then filtered and the filtrate so-obtained is added with stirring to 250 parts of a saturated aqueous solution of sodium chloride. The dyestuff which is precipitated is then filtered off, washed with a 5% aqueous solution of sodium chloride and dried.

When applied to wool from a neutral or slightly acid dyebath the dyestuff which is the 1:2-chromium complex of 1-(α-chloroacryloylamino)-8-(5'-ethylsulphonyl-2-'-hydroxyphenylazo)-7-naphthol, yields grey shades possessing excellent fastness to wet treatments and to light.

*Example 4*

A mixture of 4.48 parts of the monoazo compound obtained by coupling diazotised 5-acryloylaminoanthranilic acid with 1-carboethoxyamino-7-naphthol in alkaline medium, 1.98 parts of chromium acetate, 110 parts of ethylene glycol and 100 parts of water is stirred at the boil under a reflux condenser for 4½ hours. 10 parts of an aqueous solution of sodium potassium chromosalicylate are then added and the mixture is stirred at the boil for a further 2 hours. The mixture is then filtered and the filtrate so obtained poured into 250 parts of a saturated aqueous solution of sodium chloride. The precipitated dyestuff is then filtered off, washed with a 5% aqueous solution of sodium chloride and dried.

When applied to wool from a neutral or slightly acid dyebath the dyestuff, which is the 1:2-chromium complex of 1-carboethoxyamino-8-(4'-acryloylamino-2'-carboxyphenylazo)-7-napthol, yields brownish-violet shades possessing excellent fastness to wet treatments and to light.

The following table gives further examples of the 1:2-chromium complexes of the invention which are obtained when the monoazo compounds used in Examples 1 to 4 are replaced by the equivalent amounts of the monoazo compounds which are obtained by diazotising the amine listed in the second column of the table and coupling with the coupling components listed in the third column of the table. The fourth column of the table indicates the shades obtained when the dyestuffs are applied to woollen textile materials from a neutral or slightly acid dyebath.

azo)-6-naphthol, yields Bordeaux shades possesssing excellent fastness to light and wet treatments.

*Example 29*

A mixture of 4.46 parts of the monoazo compound obtained by coupling diazotised 6-chloro-2-aminophenol-4-sulphonamide with 1-acryloylamino-4-naphthol in alkaline medium, 1.75 parts of cobalt acetate, 80 parts of ethanol and 100 parts of water is stirred at a temperature between 20° and 25° C. for 2½ hours. The mixture is then filtered and the filtrate is added, with stirring, to 350 parts of a saturated aqueous solution of sodium chloride. The precipitated dyestuff is then filtered off, washed with a 5% aqueous solution of sodium chloride and dried.

When applied to wool from a neutral or slightly acid dyebath the dyestuff, which is the 1:2-cobalt complex of 1-acryloylamino-3-(3'-chloro-5'-sulphamyl-2'-hydroxyphenylazo)-4-naphthol, yields violet shades possessing excellent fastness to wet treatments and to light.

A similar result is obtained when the 1.75 parts of cobalt acetate used in the above example are replaced by 1.67 parts of cobalt chloride.

*Example 30*

A mixture of 4.46 parts of the monoazo compound obtained by coupling diazotised 6-chloro-2-aminophenol-4-sulphonamide with 2-acryloylamino-6-naphthol in alkaline medium, 1.75 parts of cobalt acetate, 90 parts of β-ethoxyethanol and 100 parts of water is stirred at the boil under a reflux condenser for ¾ hour. The mixture is filtered and the filtrate so obtained is poured into 300 parts of a saturated solution of sodium chloride. The precipitated dyestuff is then filtered off, washed with a 5% aqueous solution of sodium chloride and dried.

| Example | Amine | Coupling component | Shade on woollen textile materials |
|---|---|---|---|
| 5 | 6-chloro-2-aminophenol-4-sulphonamide. | 1-acryloylamino-7-naphthol | Bluish-grey. |
| 6 | 6-nitro-2-aminophenol-4-sulphonamide. | ____do____ | Grey. |
| 7 | 4:6-dinitro-2-aminophenol | 2-acryloylamino-4-methylphenol | Khaki. |
| 8 | 4-chloro-2-aminophenol | 1-acryloylamino-7-naphthol | Bluish-grey. |
| 9 | 4-nitro-2-aminophenol | 1-acryloylamino-4-naphthol | Greenish-grey. |
| 10 | Anthranilic acid-4-sulphonamide | 1-acryloylamino-7-naphthol | Violet. |
| 11 | 4-nitro-2-aminophenol | ____do____ | Greenish-grey. |
| 12 | 5-nitro-2-aminophenol | 1-acryloylamino-7-naphthol | Grey. |
| 13 | 2-aminophenol-5-sulphonamide | ____do____ | Bluish-grey. |
| 14 | 6-nitro-2-aminophenol-4-sulphonamide. | 1-acryloylamino-6-naphthol | Grey. |
| 15 | ____do____ | 1-acryloylamino-4-naphthol | Do. |
| 16 | 6-nitro-2-aminophenol-4-sulphon-N-β-hydroxyethylamide. | ____do____ | Greenish-grey. |
| 17 | 2-aminophenol-4-sulphonamide | 1-[4'-(acryloylamino)-phenyl]-3-methyl-5-pyrazolone. | Orange. |
| 18 | 2-aminophenol-5-sulphonamide | ____do____ | Scarlet. |
| 19 | 5-acryloylaminoanthranilic acid | 1-(3'-sulphonamidophenyl)-3-methyl-5-pyrazolone. | Orange. |
| 20 | 6-nitro-2-aminophenol-4-sulphonamide. | 2-acryloylamino-6-naphthol | Greenish-grey. |
| 21 | 5-nitro-2-aminophenol | 1-[4'-(acryloylamino)-phenyl]-3-methyl-5-pyrazolone. | Bordeaux. |
| 22 | Anthranilic acid | ____do____ | Yellow. |
| 23 | Anthranilic acid-4-sulphonamide | ____do____ | Do. |
| 24 | 6-chloro-2-aminophenol-4-sulphonamide. | 1-(α-chloroacryloylamino)-7-naphthol | Grey. |
| 25 | 2-aminophenol-4-sylphonamide | 4-(acryloylamino)acetoacetanilide | Reddish-yellow. |
| 26 | 4-acryloylamino-2-aminophenol | 1-(3'-sulphonamidophenyl)-3-methyl-5-pyrazolone. | Bordeaux. |
| 27 | 2-aminophenol-4:6-di(methylsulphone). | 1-acryloylamino-7-naphthol | Reddish-grey. |

*Example 28*

A mixture of 4.12 parts of the monoazo compound obtained by coupling diazotised 2-aminophenol-4-sulphonamide with 1-acryloylamino-6-naphthol in alkaline medium, 1.88 parts of hexammine cobaltic chloride, 80 parts of ethanol and 100 parts of water is stirred at the boil under a reflux condenser for ½ hour. The mixture is then cooled and the precipitated dyestuff is filtered off and dried.

When applied to wool from a neutral or slightly acid dyebath the dyestuff, which is the 1:2-cobalt complex of 1-acryloylamino-5-(5'-sulphamyl-2'-hydroxyphenyl- When applied to wool from a neutral or slightly acid dyebath the dyestuff, which is the 1:2-cobalt complex of 2-acryloylamino-5-(3'-chloro-5'-sulphamyl-2'-hydroxyphenylazo)-6-naphthol, yields violet shades possessing excellent fastness to wet treatments and to light.

The following table gives further examples of the 1:2-cobalt complexes of the invention which are obtained when the monoazo compounds used in Examples 28, 29 or 30 are replaced by the equivalent amounts of the monoazo compounds which are obtained by diazotising the amine listed in the second column of the table and coupling with the coupling component listed in the third column of the table. The fourth column of the table indicates the shades obtained when the dyestuffs are applied to woollen textile materials from a neutral or slightly acid dyebath.

phamyl-2'-hydroxyphenylazo)-7-naphthol, yields brown shades possessing excellent fastness to light and to wet treatments.

| Example | Amine | Coupling component | Shade obtained on woollen textile materials |
|---------|-------|--------------------|---------------------------------------------|
| 31 | 2-aminophenol-4-sulphonamide | 1-acryloylamino-4-naphthol | Violet. |
| 32 | 6-chloro-2-aminophenol-4-sulphonamide. | 2-acryloylamino-7-naphthol | Bordeaux. |
| 33 | 2-aminophenol-4-sulphonamide | ___do___ | Do. |
| 34 | ___do___ | 1-[4'-(acryloylamino)phenyl]-3-methyl-5-pyrazolone. | Yellow. |
| 35 | 2-aminophenol-5-sulphonamide | ___do___ | Orange. |
| 36 | 2-aminophenol-4-sulphonamide | 2-acryloylamino-6-naphthol | Reddish-violet. |
| 37 | 4-acryloylamino-2-aminophenol | 1-[4'-(acryloylamino)phenyl]-3-methyl-5-pyrazolone. | Orange-brown. |
| 38 | 2-aminophenol-5-sulphonamide | 1-acryloylamino-7-naphthol | Reddish-blue. |
| 39 | 2-aminophenol-4-sulphonamide | 4-(acryloylamino)-acetoacetanilide | Yellow. |

*Example 40*

5.7 parts of acryloyl chloride are added, with stirring, during 2 hours to a solution of 2.82 parts of the 1:2-chromium complex of the azo compound, which is obtained by coupling diazotised 2-aminophenol-4-sulphonamide with 1-(3'-aminophenyl)-3-methyl-5-pyrazolone in a mixture of 70 parts of β-ethoxyethanol and 75 parts of water, the temperature of the mixture being maintained between 0° and 5° C. by external cooling, and the pH of the mixture being maintained between 6 and 7 by the simultaneous addition of sodium acetate. The mixture is stirred for a further hour, 600 parts of a saturated aqueous solution of sodium chloride are added, and the precipitated dyestuff is filtered off, washed with a 10% aqueous solution of sodium chloride and dried.

When applied to wool from a neutral or slightly acid dyebath the dyestuff, which is the 1:2-chromium complex of 1-(3'-acryloylaminophenyl)-3-methyl-4-(5''-sulphamyl-2''-hydroxyphenylazo)-5-pyrazolone, yields orange shades possessing excellent fastness to wet treatments and to light.

In place of the 2.82 parts of the 1:2-chromium complex used in the above example there are used equivalent amounts of the 1:2-chromium complex or the 1:2-cobalt complex of the azo compound which is obtained by coupling diazotised 6-nitro-2-aminophenol-4-sulphonamide with 2-naphthol and subsequently reducing the nitro group to an amino group, or the 1:2-chromium complex of the azo compound which is obtained by coupling diazotised anthranilic acid-4-sulphonamide with 1-(3'-aminophenyl)-3-methyl-5-pyrazolone when dyestuffs are obtained which dye wool from a neutral or slightly acid dyebath in violet, Bordeaux and yellow shades respectively which possess excellent fastness to light and to wet treatments.

*Example 41*

A solution of 2.2 parts (0.005 mol) of the 1:1-chromium complex of the azo compound, which is obtained by coupling diazotised 4-nitro-2-aminophenol with 1-phenyl-3-methyl-5-pyrazolone in 50 parts of ethanol is added with stirring to a solution of 2.1 parts (0.005 mol) of the azo compound, which is obtained by coupling diazotised 2-aminophenol-4-sulphonamide with 1-acryloylamino-7-naphthol, in 50 parts of a 50% aqueous solution of ethanol at a temperature between 70° C. and 75° C. The pH of the mixed solutions is adjusted to between 7 and 8 by adding a 2 N aqueous solution of sodium hydroxide and the mixture is stirred for a further 15 minutes at a temperature between 70° and 75° C. The mixture is then filtered and the filtrate is poured into 500 parts of a 20% aqueous solution of sodium chloride. The precipitated dyestuff is then filtered off, washed with a 5% aqueous solution of sodium chloride and dried.

When applied to wool from a neutral or slightly acid dyebath the dyestuff, which is the mixed 1:2-chromium complex of 1-phenyl-3-methyl-4-(5'-nitro-2'-hydroxyphenylazo)-5-pyrazolone and 1-acryloylamino-8-(5'-sulphamyl-2'-hydroxyphenylazo)-7-naphthol, yields brown shades possessing excellent fastness to light and to wet treatments.

*Example 42*

A mixture of 5.07 parts of the monoazo compound obtained by coupling 6-nitro-1-diazo-2-oxide-naphthalene-4-sulphonamide with 1-acryloylamino-4-naphthol in alkaline medium, 1.36 parts of chromium acetate, 80 parts of ethanol and 100 parts of water is stirred at the boil under a reflux condenser for 1½ hours. 10 parts of an aqueous solution of sodium potassium chromosalicylate are then added and the mixture is stirred at the boil for a further 3½ hours. The mixture is then filtered and the filtrate so obtained is poured into 500 parts of a saturated aqueous solution of sodium chloride. The precipitated dyestuff is filtered off, washed with a 5% aqueous solution of sodium chloride and dried.

When applied to wool from a neutral or slightly acid dyebath the dyestuff, which is the 1:2-chromium complex of 1-acryloylamino-3-(2'-hydroxy-4'-sulphamyl-6'-nitronaphth-1'-ylazo)-4-naphthol, yields grey shades possessing excellent fastness to light and to wet treatments.

*Examples 43*

A mixture of 1.89 parts of the monoazo compound obtained by coupling diazotised 4-nitro-2-aminophenol with 1-acryloylamino-7-napthol in alkaline medium, 1.98 parts of the monoazo compound obtained by coupling diazotised 4-chloro-2-aminophenol with 1-[4'-(acryloylamino)phenyl]-3-methyl-5-pyrazolone in alkaline medium, 1.75 parts of cobalt acetate, 140 parts of β-ethoxyethanol and 150 parts of water is stirred at the boil under a reflux for ½ hour. The mixture is filtered and the filtrate is poured into 400 parts of a saturated aqueous solution of sodium chloride. The precipitated dyestuff is then filtered off, washed with a 5% aqueous solution of sodium chloride and then dried.

When applied to wool from a neutral or slightly acid dyebath the dyestuff, which is the mixed 1:2-cobalt complex of 1-acrylylamino-8-(5'-nitro-2'-hydroxyphenylazo)-7-naphthol and 1-(4'-acryloylaminophenyl)-3-methyl-4-(5'-chloro-2'-hydroxyphenylazo)-5-pyrazolone, yields brown shades which possess excellent fastness to wet treatments and to light.

*Example 44*

A mixture of the monoazo dyestuff obtained by diazotising 2.23 parts of 4-chloro-2-aminophenol-5-sulphonamide and coupling with 2.59 parts of 4-acryloylaminoacetoacetanilide in aqueous alkaline medium, 60 parts of ethanol, 85 parts of water and 2.9 parts of cobalt acetate is stirred at the boil under a reflux condensed for 2 hours. The mixture is then filtered and the filtrate so obtained is poured into 200 parts of a 10% aqueous solution of sodium chloride. The precipitated dyestuff is then filtered off, washed with a 10% aqueous solution of sodium chloride and dried.

When applied to wool from a neutral or slightly acid dyebath the dyestuff, which is the 1:2-cobalt complex of 4-acryloylamino-β-(5'-chloro-4'-sulphamyl-2'-hydroxyphenylazo)acetacetanilide, yields reddish-yellow shades possessing excellent fastness to wet treatments and to light.

*Example 45*

A mixture of the monoazo dyestuff obtained by diazotising 2.23 parts of 4-chloro-2-aminophenol-5-sulphonamide and coupling with 2.34 parts of 1-acryloylamino-6-naphthol in aqueous alkaline medium, 1.37 parts of cobalt acetate, 80 parts of ethanol, 45 parts of β-ethoxyethanol and 100 parts of water is stirred at the boil under a reflux condenser for 1 hour. The mixture is then cooled to 20° C., poured into 250 parts of a 20% aqueous solution of sodium chloride and the precipitated dyestuff is filtered off, washed with a 2½% aqueous solution of sodium chloride and dried.

When applied to wool from a neutral or slightly acid dyebath the dyestuff, which is the 1:2-cobalt complex of 1-acrylolylamino-5-(5'-chloro - 4' - sulphamyl-2'-hydroxyphenylazo)-6-naphthol, yields reddish-violet shades possessing excellent fastness to wet treatments and to light.

*Example 46*

A mixture of the monoazo compound obtained by diazotising 1.59 parts of 4-chloro-2-aminophenol-5-sulphonamide and coupling with 1.67 parts of 1-acryloylamino-4-naphthol in aqueous alkaline medium, 1.11 parts of chromium acetate, 100 parts of ethanol and 120 parts of water is stirred at the boil under a reflux condenser for 1½ hours. 7 parts of an aqueous solution of sodium potassium chromosalicylate are then added and the mixture is stirred at the boil under a reflux condenser for a further 6 hours. The mixture is then filtered and the filtrate so obtained is poured into 700 parts of a saturated aqueous solution of sodium chloride. The precipitated dyestuff is then filtered off, washed with a 10% aqueous solution of sodium chloride and dried.

When applied to wool from a neutral or slightly acid dyebath the dyestuff, which is the 1:2-chromium complex of 1-acryloylamino - 3-(5'-chloro -4'-sulphamyl-2'-hydroxyphenylazo)-4-naphthol, yields blue shades possessing excellent fastness to wet treatments and to light.

*Example 47*

A mixture of the monoazo compound obtained by diazotising 2.78 parts of 4-chloro-2-aminophenol-5-sulphonamide and coupling with 3.2 parts of 1-(4'-acryloylaminophenyl) - 3 - methyl - 5 - pyrazolone in aqueous alkaline medium, 2.7 parts of chromium acetate, 60 parts of ethanol and 80 parts of water is stirred at the boil under a reflux condenser for 1 hour, 5 parts of an aqueous solution of the chromium complex of sodium salicylate (the preparation of which is described in Example 1 of British specification No. 791,438) are then added and the mixture is stirred for a further 3 hours at the boil. The mixture is then cooled to 20° C., poured into 300 parts of a 10% aqueous solution of sodium chloride and the precipitated dyestuff is filtered off, washed with a 5% aqueous solution of sodium chloride and dried.

When applied to wool from a neutral or slightly acid dyebath the dyestuff, which is the 1:2-chromium complex of 1-(4'-acryloylaminophenyl)-3-methyl-4-(5''-chloro-4''-sulphamyl-2''-hydroxyphenylazo)-5-pyrazolone, yields red shades possessing excellent fastness to wet treatments and to light.

*Example 48*

A mixture of the monoazo compound obtained by diazotising 1.25 parts of 4-chloro-2-aminophenol-6-sulphondimethylamide and coupling with 1.28 parts of 1-(4'-acryloylaminophenyl)-3-methyl-5-pyrazolone in alkaline medium, 2 parts of chromium acetate, 70 parts of ethanol, 70 parts of β-ethoxyethanol and 60 parts of water is stirred at the boil under a reflux condenser for 2 hours. The mixture is then filtered and the filtrate is poured into 500 parts of a 7% aqueous solution of sodium chloride. The precipitated dyestuff is then filtered off, washed with a 5% aqueous solution of sodium chloride and dried.

When applied to wool from a neutral or slightly acid dyebath the dyestuff, which is the 1:2-chromium complex of 1-(4'-acryloylaminophenyl)-3-methyl-4-(3''-N:N-dimethylsulphamyl-5''-chloro-2'' - hydroxyphenylazo)-5-pyrazolone, yields red shades possessing excellent fastness to wet treatments and to light.

*Example 49*

A mixture of the monoazo compound obtained by diazotising 4.32 parts of 2-aminophenol-4-sulphonethylamide and coupling with 5.1 parts of 1-(4'-acryloylaminophenyl)-3-methyl-5-pyrazolone in alkaline medium, 4 parts of chromium acetate, 65 parts of ethanol and 80 parts of water is stirred at the boil under a reflux condenser for ½ hour. 70 parts of β-ethoxyethanol and 10 parts of an aqueous solution of the chromium complex of sodium salicylate (which is obtained as described in British specification No. 791,438) are then added and the mixture is stirred at the boil for a further 5 hours. The mixture is then filtered, and the filtrate so obtained is poured into 550 parts of a 10% aqueous solution of sodium chloride. The precipitated dyestuff is then filtered off, washed with a 5% aqueous solution of sodium chloride and dried.

When applied to wool from a neutral or slightly acid dyebath the dyestuff, which is the 1:2-chromium complex of 1 - (4'-acryloylaminophenyl)-3-methyl-4-(5''-N-ethylsulphamyl-2''-hydroxyphenylazo) - 5 - pyrazolone, yields orange shades possessing excellent fastness to wet treatments and to light.

*Example 50*

A mixture of the monoazo compound obtained by diazotising 4.32 parts of 2-aminophenol-4-sulphondimethylamide and coupling with 5.1 parts of 1-(4'-acryloylaminophenyl)-3-methyl-5-pyrazolone in alkaline medium, 3.1 parts of cobalt acetate, 100 parts of ethanol and 10 parts of water is stirred at the boil under a reflux condenser for 1½ hours. The mixture is then filtered and the filtrate is added, with stirring, to 350 parts of a saturated aqueous solution of sodium chloride. The precipitated dyestuff is then filtered off, washed with a 5% aqueous solution of sodium chloride and dried.

When applied from a neutral or slightly acid dyebath the dyestuff, which is the 1:2-cobalt complex of 1-(4'-acryloylaminophenyl)-3-methyl-4-(5''-N:N - dimethylsulphamyl-2''-hydroxyphenylazo)-5-pyrazolone, yields reddish-yellow shades possessing excellent fastness to wet treatments and to light.

*Example 51*

A mixture of the monoazo compound obtained by diazotising 4.32 parts of 2-aminophenol-4-sulphondimethylamide and coupling with 5.1 parts of 1-(4'-acryloylaminophenyl)-3-methyl-5-pyrazolone in alkaline medium, 3.39 parts of chromium acetate, 100 parts of ethanol and 15 parts of water is stirred at the boil under a reflux condenser for 3 hours. The mixture is then cooled to 20° C., poured into 300 parts of a 10% aqueous solution of sodium chloride and the precipitated dyestuff is filtered off, washed with a 5% aqueous solution of sodium chloride and dried.

When applied to wool from a neutral or slightly acid dyebath the dyestuff, which is the 1:2-chromium complex of 1-(4'-acryloylaminophenyl)-3-methyl-4-(5''-N:N-dimethylsulphamyl-2''-hydroxyphenylazo)-5 - pyrazolone, yields orange shades possessing excellent fastness to light and to wet treatments.

The following table gives further examples of the 1:2-chromium or 1:2-cobalt complexes of the invention which are obtained by treating the monoazo compounds listed in the second column of the table, with a metallising agent of the metal listed in the third column of the table by methods similar to those described in Examples 44 to 51. The fourth column of the table indicates the shades obtained when the dyestuffs, which are the 1:2-chromium or 1:2-cobalt complexes of the said monoazo compounds, are applied to wool.

is then filtered off, washed with a 10% aqueous solution of sodium chloride and dried.

When applied to wool, the dyestuff, which is the 1:2-chromium complex of 1-(2'-methyl-5'-acryloylaminophenyl)-3-methyl-4-(4''-nitro-2''-hydroxyphenylazo) - 5-

| Example | Monoazo Compound | Metal | Shade |
|---|---|---|---|
| 52 | 1-(4'-acryloylaminophenyl)-3-methyl-4-(2''-hydroxy-4''-sulphamyl-5''-chlorophenylazo)-5-pyrazolone. | Cobalt | Reddish-yellow. |
| 53 | 1-acryloylamino-8-(2'-hydroxy-4'-sulphamyl-5'-chlorophenylazo)-7-naphthol | Chromium | Grey. |
| 54 | ....do.... | Cobalt | Bluish-grey. |
| 55 | 1-acryloylamino-3-(2'-hydroxy-4'-sulphamyl-5'-chlorophenylazo)-4-naphthol | ....do.... | Bluish-violet. |
| 56 | 1-acryloylamino-5-(2'-hydroxy-4'-sulphamyl-5'-chlorophenylazo)-6-naphthol | Chromium | Reddish-blue. |
| 57 | 1-($\alpha$-chloroacryloylamino)-8-(2'-hydroxy-4'-sulphamyl-5'-chlorophenylazo)-7-naphthol. | Cobalt | Bluish-grey. |
| 58 | 1-[2'-methyl-5'-(acryloylamino)phenyl]-3-methyl-4-(2''-hydroxy-4''-sulphamyl-5''-chlorophenylazo)-5-pyrazolone. | ....do.... | Reddish-yellow. |
| 59 | ....do.... | Chromium | Red. |
| 60 | 1-(4'-acryloylaminophenyl)-3-methyl-4-(5''-N:N-diethylsulphamyl-2''-hydroxyphenylazo)-5-pyrazolone. | ....do.... | Orange. |
| 61 | ....do.... | Cobalt | Reddish-yellow. |
| 62 | 1-(4'-acryloylaminophenyl)-3-methyl-4-(5''-N-methylsulphamyl-2''-hydroxyphenylazo)-5-pyrazolone. | Chromium | Orange. |
| 63 | 1-(4'-acryloylaminophenyl)-3-methyl-4-(4''-N:N-dimethylsulphamyl-2''-hydroxyphenylazo)-5-pyrazolone. | ....do.... | Scarlet. |
| 64 | 1-(4'-acryloylaminophenyl)-3-methyl-4-(5''-N-isopropylsulphamyl-2''-hydroxyphenylazo)-5-pyrazolone. | ....do.... | Orange. |
| 65 | 1-(3'-acryloylaminophenyl)-3-methyl-4-(5''-N-$\beta$-hydroxyethylsulphamyl-2''-hydroxyphenylazo)-5-pyrazolone. | ....do.... | Do. |
| 66 | 1-(2'-methyl-5'-acryloylaminophenyl)-3-methyl-4-(5''-N:N-dimethylsulphamyl-2''-hydroxyphenylazo)-5-pyrazolone. | ....do.... | Do. |
| 67 | 1-(4'-acryloylaminophenyl)-3-methyl-4-(5''-sulphonmorpholyl-2''-hydroxyphenylazo)-5-pyrazolone. | ....do.... | Do. |

*Example 68*

A mixture of the monoazo compound obtained by diazotising 3.85 parts of 5-nitro-2-aminophenol and coupling with 7.06 parts of 1-(2'-methyl-5'-acryloylaminophenyl)-3-methyl-5-pyrazolone in aqueous alkaline medium, 120 parts of ethanol, 50 parts of water and 25 parts of an aqueous solution of sodium chrome salicylate (which is obtained as described in British specification No. 791,438) is stirred at the boil under a reflux condenser for 4 hours. The solution is cooled to 20° C., poured, with stirring, into 600 parts of a 10% aqueous solution of sodium chloride and the precipitated dyestuff pyrazolone, yields bluish-red shades possessing excellent fastness to wet treatments and to light.

The following table gives further examples of the 1:2-chromium and 1:2-cobalt complexes of the invention which are obtained when the monoazo compounds listed in the second column of the table are treated with a metallising agent of the metal listed in the third column of the table by methods similar to those described in Examples 1 to 4, 28 to 30, 40, 42 and 44 to 51. The fourth column of the table indicates the shades obtained when the 1:2-chromium or 1:2-cobalt complexes of the said monoazo compounds are applied to wool.

| Example | Monoazo Compound | Metal | Shade |
|---|---|---|---|
| 69 | 1-phenyl-3-methyl-4-(4'-acryloylamino-2'-carboxyphenylazo)-5-pyrazolone | Chromium | Orange. |
| 70 | 1-(3'-chlorophenyl)-3-methyl-4-(4''-acryloylamino-2''-carboxyphenylazo)-5-pyrazolone. | ....do.... | Do. |
| 71 | 1-(4'-acryloylamino-2'-carboxyphenylazo)-2-naphthol | ....do.... | Reddish-brown. |
| 72 | 1-(4'-acryloylamino-2'-carboxyphenylazo)-2-naphthol-6-sulphonamide | ....do.... | Do. |
| 73 | 2-(4'-acryloylamino-2'-carboxyphenylazo)-1-naphthol-3-sulphonamide | ....do.... | Bluish-bordeaux. |
| 74 | 1-(5'-acryloylamino-2'-hydroxyphenylazo)-2-naphthol | Cobalt | Reddish-violet. |
| 75 | 1-phenyl-3-methyl-4-(5-acryloylamino-2'-hydroxyphenylazo)-5-pyrazolone | Chromium | Bluish-red. |
| 76 | ....do.... | Cobalt | Orange-brown. |
| 77 | $\beta$-(5'-acryloylamino-2'-hydroxyphenylazo)acetoacetanilide | ....do.... | Yellowish-orange. |
| 78 | ....do.... | Chromium | Orange. |
| 79 | 1-(2'-methylphenyl)-3-methyl-4-(5''-acryloylamino-2''-hydroxyphenylazo)-5-pyrazolone. | ....do.... | Bluish-red. |
| 80 | 1-(2'-chlorophenyl)-3-methyl-4-(5''-acryloylamino-2''-hydroxyphenylazo)-5-pyrazolone. | ....do.... | Do. |
| 81 | 1-(2'-methoxyphenyl)-3-methyl-4-(5''-acryloylamino-2''-hydroxyphenylazo)-5-pyrazolone. | ....do.... | Do. |
| 82 | 1-(2'5:'-dichlorophenyl)-3-methyl-4-(5''-acryloylamino-2''-hydroxyphenylazo)-5-pyrazolone. | ....do.... | Bluish-red. |
| 83 | 1-carboethoxyamino-3-(5'-acryloylamino-2-hydroxyphenylazo)-4-naphthol | ....do.... | Reddish-blue. |
| 84 | ....do.... | Cobalt | Reddish-violet. |

| Example | Monoazo Compound | Metal | Shade |
|---|---|---|---|
| 85 | 2-(5'-acryloylamino-2'-hydroxyphenylazo)-1-naphthol-3-sulphonamide | Cobalt | Bluish-violet. |
| 86 | ----do---- | Chromium | Reddish-blue. |
| 87 | 1-carbomethoxyamino-8-(5'-acryloylamino-2'-hydroxyphenylazo)-7-naphthol | ----do---- | Grey. |
| 88 | 1-carbopropoxyamino-8-(5'-acryloylamino-2'-hydroxyphenylazo)-7-naphthol | ----do---- | Do. |
| 89 | 1-acetylamino-8-(5'-acryloylamino-2'-hydroxyphenylazo)-7-naphthol | ----do---- | Do. |
| 90 | 1-benzoylamino-8-(5'-acryloylamino-2'-hydroxyphenylazo)-7-naphthol | ----do---- | Do. |
| 91 | 2-(5'-acryloylamino-2'-hydroxyphenylazo)-5:8-dichloro-1-naphthol | ----do---- | Reddish-blue. |
| 92 | 3-(5'-acryloylamino-2'-hydroxyphenylazo)-2:4-dihydroxyquinoline | ----do---- | Red. |
| 93 | 1-[5'-(N-methylacryloylamino)-2'-hydroxyphenylazo]-2-naphthol | ----do---- | Violet. |
| 94 | ----do---- | Cobalt | Bluish-bordeaux. |
| 95 | 1-(4'-acryloylaminophenyl)-3-methyl-4-(4''-chloro-2''-hydroxyphenylazo)-5-pyrazolone. | Chromium | Scarlet. |
| 96 | 1-(4'-acryloylaminophenyl)-3-methyl-4-(5''-chloro-2''-hydroxyphenylazo)-5-pyrazolone. | ----do---- | Red. |
| 97 | ----do---- | Cobalt | Orange. |
| 98 | 1-(4'-acryloylaminophenyl)-3-methyl-4-(5''-β-hydroxyethylsulphonyl-2''-hydroxyphenylazo)-5-pyrazolone. | ----do---- | Yellow. |
| 99 | ----do---- | Chromium | Orange. |
| 100 | 1-(4'-acryloylaminophenyl)-3-methyl-4-(5''-n-propylsulphonyl-2''-hydroxyphenylazo)-5-pyrazolone. | ----do---- | Do. |
| 101 | 1-(4'-acryloylaminophenyl)-3-methyl-4-(5''-nitro-2''-hydroxyphenylazo)-5-pyrazolone. | ----do---- | Do. |
| 102 | ----do---- | Cobalt | Reddish-yellow. |
| 103 | 1-(4'-acryloylaminophenyl)-3-methyl-4-(5''-methylsulphonyl-2''-hydroxyphenylazo-5-pyrazolone. | Chromium | Orange. |
| 104 | 1-(4'-acryloylaminophenyl)-3-methyl-4-(3'':5''-dimethylsulphonyl-2''-hydroxyphenylazo)-5-pyrazolone. | ----do---- | Do. |
| 105 | 1-(4'-acryloylaminophenyl)-3-methyl-4-(5''-ethylsulphonyl-2''-hydroxyphenylazo)-5-pyrazolone. | ----do---- | Do. |
| 106 | 1-(4'-acryloylaminophenyl)-3-methyl-4-(2''-hydroxyphenylazo)-5-pyrazolone | ----do---- | Do. |
| 107 | 1-(3'-acryloylaminophenyl)-3-methyl-4-(2''-carboxyphenylazo)-5-pyrazolone | ----do---- | Yellow. |
| 108 | 1-(3'-acryloylaminophenyl)-3-methyl-4-(4''-chloro-2''-carboxyphenylazo)-5-pyrazolone. | ----do---- | Orange. |
| 109 | 1-(3'-acryloylaminophenyl)-3-methyl-4-(4''-sulphamyl-2''-hydroxyphenylazo)-5-pyrazolone. | ----do---- | Scarlet. |
| 110 | 1-(3'-acryloylaminophenyl)-3-methyl-4-(5''-sulphamyl-2''-hydroxyphenylazo)-5-pyrazolone. | Chromium | Orange. |
| 111 | ----do---- | Cobalt | Reddish-yellow. |
| 112 | 1-(3'-acryloylaminophenyl)-3-methyl-4-(5''-sulphamyl-2''-carboxyphemylazo)-5-pyrazolone. | Chromium | Yellow. |
| 113 | 1-(3'-acryloylaminophenyl)-3-methyl-4-(5''-β-hydroxyethylsulphonyl-2''-hydroxyphenylazo)-pyrazolone. | ----do---- | Orange. |
| 114 | ----do---- | Cobalt | Reddish-yellow. |
| 115 | 1-(3'-acryloylaminophenyl)-3-methyl-4-(4''-nitro-2''-hydroxyphenylazo)5-pyrazolone. | ----do---- | Red. |
| 116 | ----do---- | Chromium | Bluish-red. |
| 117 | 1-(2'-acryloylaminophenyl)-3-methyl-4-(5''-sulphamyl-2''-hydroxyphenylazo)-5-pyrazolone. | ----do---- | Orange. |
| 118 | 1-(2'-acryloylaminophenyl)-3-methyl-4-(2''-carboxyphenylazo)-5-pyrazolone | ----do---- | Yellow. |
| 119 | 1-(2'-methyl-5'-acryloylaminophenyl)-3-methyl-4-(5''-sulphamyl-2''-hydroxyphenylazo)-5-pyrazolone. | ----do---- | Orange. |
| 120 | ----do---- | Cobalt | Reddish-yellow. |
| 121 | 1-(2'-methyl-5'-acryloylaminophenyl)-3-methyl-4-(5''-nitro-2''-hydroxyphenylazo)-5-pyrazolone. | ----do---- | Do. |
| 122 | ----do---- | Chromium | Orange. |
| 123 | 1-(2'-methyl-5'-acryloylaminophenyl)-3-methyl-4-(4''-sulphamyl-2''-hydroxyphenylazo)-5-pyrazolone. | ----do---- | Scarlet. |
| 124 | ----do---- | Cobalt | Orange. |
| 125 | 1-(2'-methyl-5'-acryloylaminophenyl)-3-methyl-4-(4''-chloro-2''-hydroxyphenylazo)-5-pyrazolone. | ----do---- | Reddish-yellow. |
| 126 | ----do---- | Chromium | Reddish-orange. |
| 127 | 1-(2'-methyl-5'-acryloylaminopheny)-3-methyl-4-(5''-chloro-2''-hydroxyphenylazo)-5-pyrazolone. | ----do---- | Red. |
| 128 | ----do---- | Cobalt | Orange. |
| 129 | 1-(2'-methyl-5'-acryloylaminophenyl)-3-methyl-4-(4''-nitro-2''-hydroxyphenylazo)-5-pyrazolone. | ----do---- | Do. |
| 130 | 1-(2'-methyl-5'-acryloylaminophenyl)-3-methyl-4-(2''-carboxyphenylazo)-5-pyrazolone. | Chromium | Yellow. |
| 131 | 1-acryloylamino-8-(3':5'-dinitro-2'-hydroxyphenylazo)-7-naphthol | ----do---- | Olive. |
| 132 | 1-acryloylamino-8-(3':5':6'-trichloro-2'-hydroxyphenylazo)-7-naphthol | ----do---- | Greenish-grey. |
| 133 | ----do---- | Cobalt | Reddish-grey. |
| 134 | 1-acryloylamino-8-(5'-methoxy-2'-hydroxyphenylazo)-7-naphthol | ----do---- | Bluish-grey. |
| 135 | ----do---- | Chromium | Greenish-grey. |
| 136 | 1-acryloylamino-8-(3'-chloro-5'-methyl-2'-hydroxyphenylazo)-7-naphthol | ----do---- | Olive. |
| 137 | 1-acryloylamino-8-(3'-chloro-5'-methyl-2'-hydroxyphenylazo)-7-naphthol | Cobalt | Violet. |
| 138 | 1-acryloylamino-8-(5'-nitro-2'-hydroxyphenylazo)-7-naphthol | ----do---- | Reddish-grey. |
| 139 | 1-acryloylamino-8-(5'-methyl-2'-hydroxyphenylazo)-7-naphthol | ----do---- | Bluish-violet. |
| 140 | 1-acryloylamino-3-(5'-nitro-2'-hydroxyphenylazo)-4-naphthol | ----do---- | Bordeaux. |
| 141 | 1-acryloylamino-3-(3':5'-dinitro-2'-hydroxypheny azo)-4-naphthol | Chromium | Olive. |
| 142 | 1-acryloylamino-3-(5'-chloro-2'-hydroxyphenylazo)-4-naphthol | ----do---- | Bluish-violet. |
| 143 | ----do---- | Cobalt | Bordeaux. |
| 144 | 1-acryloylamino-3-(3':5'-dichloro-2'-hydroxyphenylazo)-4-naphthol | ----do---- | Bluish-bordeaux. |
| 145 | ----do---- | Chromium | Bluish-grey. |
| 146 | 1-acryloylamino-3-(4'-sulphamyl-2'-hydroxyphenylazo)-4-naphthol | ----do---- | Do. |
| 147 | ----do---- | Cobalt | Violet. |
| 148 | 1-acryloylamino-3-(5'-methyl-2'-hydroxyphenylazo)-4-naphthol | ----do---- | Bluish-bordeaux. |
| 149 | 1-acryloylamino-3-(5'-N:N-dimethylsulphamyl-2'-hydroxyphenylazo)-4-naphthol. | ----do---- | Do. |
| 150 | ----do---- | Chromium | Violet. |
| 151 | 1-acryloylamino-3-[5'-N:N-di(β-hydroxyethyl)sulphamyl-2'-hydroxyphanylazo]-4-naphthol. | ----do---- | Do. |
| 152 | 1-acryloylamino-3-(5'-N-phenylsulphamyl-2'-hydroxyphenylazo)-4-naphthol | ----do---- | Do. |
| 153 | 1-acryloylamino-3-(5'-N-propylsulphamyl-2'-hydroxyphenylazo)-4-naphthol | ----do---- | Do. |
| 154 | 1-acryloylamino-3-(5'-N:N-dipropylsulphamyl-2'-hydroxyphenylazo)-4-naphthol. | ----do---- | Do. |
| 155 | 1-acryloylamino-3-(4'-chloro-2'-hydroxyphenylazo)-4-naphthol | ----do---- | Do. |
| 156 | 1-acryloylamino-3-(4'-chloro-2'-hydroxyphenylazo)-4-naphthol | Cobalt | Bordeaux. |
| 157 | 1-acryloylamino-3-(3'-chloro-5'-methyl-2'-hydroxyphenylazo)-4-naphthol | ----do---- | Bluish-bordeaux. |
| 158 | ----do---- | Chromium | Violet. |
| 159 | 1-acryloylamino-5-(5'-sulphamyl-2'-hydroxyphenylazo)-6-naphthol | ----do---- | Brownish-violet. |
| 160 | 1-acryloylamino-5-(4'-sulphamyl-2'-hydroxyphenylazo)-6-naphthol | ----do---- | Bluish-violet. |
| 161 | ----do---- | Cobalt | Bordeaux. |
| 162 | 1-acryloylamino-5-(5'-nitro-2'-hydroxyphenylazo)-6-naphthol | ----do---- | Reddish-brown. |
| 163 | ----do---- | Chromium | Grey. |
| 164 | 1-acryloylamino-5-(5'-sulphamyl-2'-carboxyphenylazo)-6-naphthol | ----do---- | Reddish-brown. |
| 165 | 2-acryloylamino-5-(5'-sulphamyl-2'-hydroxyphenylazo)-6-naphthol | ----do---- | Brownish-grey. |
| 166 | 2-acryloylamino-5-(4'-sulphamyl-2'-hydroxyphenylazo)-6-naphthol | ----do---- | Reddish-grey. |
| 167 | ----do---- | Cobalt | Violet. |

| Example | Monoazo Compound | Metal | Shade |
|---|---|---|---|
| 168 | 2-acryloylamino-5-(5'-nitro-2'-hydroxyphenylazo)-6-naphthol | Cobalt | Reddish-brown. |
| 169 | ___do___ | Chromium | Olive. |
| 170 | 2-acryloylamino-8-(5'-nitro-2'-hydroxyphenylazo)-7-naphthol | ___do___ | Brown. |
| 171 | ___do___ | Cobalt | Reddish-brown. |
| 172 | 2-acryloylamino-8-(4'-nitro-2'-hydroxyphenylazo)-7-naphthol | Chromium | Grey. |
| 173 | 2-acryloylamino-8-(5'-sulphamyl-2'-hydroxyphenylazo)-7-naphthol | ___do___ | Brownish-violet. |
| 174 | 1-[4'-(α-chloroacryloylamino)phenyl]-3-methyl-4-(4"-sulphamyl-2"-hydroxyphenylazo)-5-pyrazolone. | ___do___ | Scarlet |
| 175 | ___do___ | Cobalt | Orange. |
| 176 | 4-acryloylamino-β-(5'-N:N-dimethysulphamyl-2'-hydroxyphenylazo)-acetoacetanilide. | ___do___ | Yellow. |
| 177 | 4-acryloylamino-β-(4'-nitro-2'-hydroxyphenylazo)-acetoacetanilide | ___do___ | Yellowish-red. |
| 178 | 4-acryloylamino-β-(5'-nitro-2'-hydroxyphenylazo)-acetoacetanilide | ___do___ | Yellow. |
| 179 | 4-acryloylamino-β-(5'-chloro-2'-hydroxyphenylazo)-acetoacetanilide | ___do___ | Do. |
| 180 | 4-acryloylamino-β-(4'-N:N-dimethysulphamyl-2'-hydroxyphenylazo)-acetoacetanilide. | ___do___ | Reddish-yellow. |
| 181 | 4-acryloylamino-β-(4'-sulphamyl-2'-hydroxyphenylazo)-acetoacetanilide | ___do___ | Do. |
| 182 | 2-acryloylamino-4-methyl-6-(3'-nitro-5'-sulphamyl-2'-hydroxyphenylazo)-phenol. | ___do___ | Reddish-brown. |
| 183 | ___do___ | Chromium | Bluish-brown. |
| 184 | 2-acryloylamino-4-methyl-6-(5'-nitro-2'-hydroxyphenylazo)-phenol | ___do___ | Reddish-brown. |
| 185 | ___do___ | Cobalt | Do. |
| 186 | 3-acryloylamino-4-methyl-6-(5'-nitro-2'-hydroxyphenylazo)-phenol | ___do___ | Do. |
| 187 | ___do___ | Chromium | Do. |
| 188 | 3-acryloylamino-4-methyl-6-(3':5'-dinitro-2'-hydroxyphenylazo)-phenol | ___do___ | Brown. |
| 189 | ___do___ | Cobalt | Reddish-brown. |
| 190 | 3-acryloylamino-4-methyl-6-(3'-nitro-5'-sulphamyl-2'-hydroxyphenylazo) phenol. | ___do___ | Do. |
| 191 | ___do___ | Chromium | Brownish-violet. |
| 192 | 1:3-dimethyl-4-(5'-acryloylamino-2'-hydroxyphenylazo)-5-pyrazolone | ___do___ | Bluish-red. |
| 193 | 1-phenyl-3-methyl-4-(4'-acryloylamino-2'-carboxyphenylazo)5-aminopyrazole | ___do___ | Yellow. |
| 194 | 6-acetyl-1-(5'-acryloylamino-2'-hydroxyphenylazo)-2-naphthol | Cobalt | Bordeaux. |
| 195 | 4-acetyl-2-(5'-acryloylamino-2'-hydroxyphenylazo)-1-naphthol | Chromium | Bluish-violet. |
| 196 | 1-(4'-acryloylaminophenyl)-3-methyl-4-(4"-nitro-6"-bromo-2"-hydroxyphenylazo)-5-pyrazolone. | ___do___ | Red. |
| 197 | 1-acryloylamino-8-(4'-sulphamyl-2'-hydroxynaphth-1'-ylazo)-7-naphthol | ___do___ | Grey. |
| 198 | 1-acryloylamino-8-(5'-phenylsulphonyl-2'-hydroxyphenylazo)-7-naphthol | ___do___ | Do. |
| 199 | 1-phenyl-3-carbomethoxy-4-(5'-acryloylamino-2'-hydroxyphenylazo)-5-pyrazolone. | ___do___ | Red. |
| 200 | 1-phenyl-3-carboethoxy-4-(5'-acryloylamino-2'-hydroxyphenylazo)-5-pyrazolone. | ___do___ | Do. |
| 201 | 1-(naphth-1'-yl)-3-methyl-4-(5'-acryloylamino-2'-hydroxyphenylazo)-5-pyrazolone. | ___do___ | Do. |
| 202 | 1-(6'-sulphamylnaphth-2'-yl)-3-methyl-4-(5'-acryloylamino-2'-hydroxyphenylazo)-5-pyrazolone. | ___do___ | Do. |
| 203 | 4-methyl-2-(5'-acryloylamino-2'-hydroxyphenylazo)-phenol | ___do___ | Brown. |
| 204 | 1-phenyl-4-(5'-acryloylamino-2'-hydroxyphenylazo)-5-pyrazolone-3-carboxyanilide. | ___do___ | Red. |
| 205 | 1-phenyl-4-(5'-acryloylamino-2'-hydroxyphenylazo)-5-pyrazolone-3-carboxy-o-chloroanilide. | ___do___ | Do. |
| 206 | 1-phenyl-4-(5'-acryloylamino-2'-hydroxyphenylazo)-5-pyrazolone-3-carboxy-p-anisidide. | ___do___ | Do. |
| 207 | 1-acryloylamino-8-(5'-acryloyamino-2'-hydroxyphenylazo)-7-naphthol | Cobalt | Blue. |
| 208 | 1-(5'-acryloylamino-2'-hydroxyphenylazo)-2-naphthlamine | ___do___ | Bluish-grey. |
| 209 | 1-(5'-acryloylamino-2'-hydroxyphenylazo)-6-sulphamyl-2-naphthylamine | ___do___ | Do. |
| 210 | 1-acryloylamino-8-(4'-nitro-6'-bromo-2'-hydroxyphenylazo)-7-naphthol | Chromium | Olive. |
| 211 | 1-benzenesulphonylamino-8-(5'-acryloylamino-2'-hydroxyphenylazo)-7-naphthol. | ___do___ | Grey. |
| 212 | 1-(p-toluenesulphonylamino)-8-(5'-acryloylamino-2'-hydroxyphenylazo)-7-naphthol. | ___do___ | Do. |

*Example 213*

A mixture of 1.75 parts (0.004 mol) of the 1:1-chromium complex of 1-(2'-hydroxy-5'-chlorophenylazo)-2-naphthol, 1.785 parts (0.004 mol) of 2-(2'-hydroxy-5'-chloro - 4'-sulphamylphenylazo)-4-acryloylamino-1-naphthol, 0.32 part of sodium carbonate, 80 parts of ethanol and 50 parts of water is stirred at the boil under a reflux condenser for ½ hour. The resulting solution is then cooled to 20° C., filtered and the filtrate so obtained is poured into 400 parts of a 20% aqueous solution of sodium chloride. The precipitated dyestuff is then filtered off, dissolved in 250 parts of water at 75° to 80° C. 12.5 parts of sodium chloride are then added and the dyestuff which is precipitated is finally filtered off and dried.

When applied to wool, the dyestuff yields bluish-violet shades possessing excellent fastness to wet treatments and to light.

In place of the 1:1-chromium complex and the monoazo compound used in the above example there are used equivalent amounts of the 1:1-chromium complex of 1-(2'-hydroxy-4'-nitrophenylazo)-2-naphthol and of the azo compound 2 - (2' - hydroxy - 4'-sulphamylphenylazo)-4-acryloylamino-1-naphthol, whereby a dyestuff is obtained which yields bluish-grey shades on wool, possessing excellent fastness to light and to wet treatments.

*Example 214*

A solution of 6 parts of β-chloroacryloyl chloride in 15 parts of acetone is added, with stirring, during 1 hour to a solution of 2.57 parts of the 1:2-cobalt complex of 1-(2' - hydroxy - 3'-amino-5'-sulphamylphenylazo)-2-naphthol (which is obtained by coupling diazotized 6-nitro-2-aminophenol-4-sulphonamide with 2-naphthol, converting the monoazo compound to the 1:2-cobalt complex and subsequently reducing the nitro groups to amino groups) in a mixture of 90 parts of β-ethoxyethanol and 100 parts of water, the temperature of the mixture being maintained between 0° and 5° C. by external cooling and the pH of the mixture being maintained between 6.5 and 7 by the addition of a 10% aqueous solution of sodium carbonate as necessary. The resulting mixture is stirred a further ½ hour at 0° to 5° C. and is then poured into 700 parts of a saturated aqueous solution of sodium chloride. The precipitated dyestuff is then filtered off, dried and washed with 100 parts of chloroform and finally dried. On analysis the dyestuff is found to contain 2.1 atoms of hydrolysable chlorine per molecule of dyestuff.

When applied to wool the dyestuff yields bordeaux shades possessing excellent fastness to wet treatments and to light.

In place of the 6 parts of β-chloroacryloyl chloride used in the above example there are used 7.7 parts of α:β-dichloroacryloyl chloride when a dyestuff is obtained which contains 4 atoms of hydrolysable chlorine and which dyes wool in bordeaux shades possessing excellent fastness to light and to wet treatments.

The following table gives further examples of 1:2-chromium or 1:2-cobalt complexes of the invention which are obtained when the 1:2-metal complexes listed in the second column of the table are treated with acryloyl chloride by methods similar to that described in Example 40. The third column of the table indicates the shades obtained when the resulting 1:2-chromium or 1:2-cobalt complexes are applied to wool.

1-amino-7-naphthol hydrochloride in 300 parts of water, the temperature of the mixture being maintained between 0° and 5° C. by external cooling, and the mixture being maintained neutral to Congo red by the simultaneous addition of sodium acetate. The mixture is then stirred for 1 hour, acidified to Congo red with a concentrated aqueous solution of hydrochloric acid and the precipitated product is filtered off, washed with water and dried. The

| Example | 1:2-metal complex compound | Shade on wool |
| --- | --- | --- |
| 215 | 1:2-chromium complex of 1-(4'-aminophenyl)-3-methyl-4-(2''-hydroxylphenylazo)-5-pyrazolone. | Orange. |
| 216 | 1:2-chromium complex of 1-(4'-aminophenyl)-3-methyl-4-(2''-hydroxy-5''-sulphamylphenylazo)-5-pyrazolone. | Do. |
| 217 | 1:2-chromium complex of 1-(3'-aminophenyl)-3-methyl-4-(2''-hydroxy-5''-sulphamylphenylazo)-5-pyrazolone. | Do. |
| 218 | 1:2-chromium complex of 1-(3'-aminophenyl)-3-methyl-4-(2''-hydroxy-4''-sulphamylphenylazo)-5-pyrazolone. | Scarlet. |
| 219 | 1:2-chromium complex of 1-(3'-aminophenyl)-3-methyl-4-(2''-carboxy-5''-sulphamylphenylazo)-5-pyrazolone. | Reddish-yellow. |
| 220 | 1:2-chromium complex of 1-(3'-sulphamylphenyl)-3-methyl-4-(2''-hydroxy-4''-aminophenylazo)-5-pyrazolone. | Red. |
| 221 | 1:2-chromium complex of 1-(2'-hydroxy-4'-aminophenylazo)-2-naphthol. | Violet. |
| 222 | 1:2-cobalt complex of 1-(2'-hydroxy-4'-aminophenylazo)-2-naphthol. | Bordeaux. |
| 223 | 1:2-chromium complex of 1-(2'-hydroxy-4'-aminophenylazo)-8-acetylamino-2-naphthol. | Bluish-grey. |
| 224 | 1:2-cobalt complex of 1-(2'-hydroxy-4'-aminophenylazo)-8-acetylamino-2-naphthol. | Do. |
| 225 | 1:2-cobalt complex of 1-(2'-hydroxy-3'-amino-5'-sulphamylphenylazo)-6-sulphamyl-2-naphthol. | Bordeaux. |
| 226 | 1:2-chromium complex of 1-phenyl-3-methyl-4-(2'-hydroxy-5'-aminophenylazo)-5-pyrazolone. | Reddish brown. |
| 227 | 1:2-chromium complex of 1-(2'-hydroxy-3'-amino-5'-N:N-dimethylsulphamylphenylazo)-2-naphthol. | Violet. |
| 228 | 1:2-cobalt complex of 1-(2'-hydroxy-3'-amino-5'-N:N-dimethylsulphamylphenylazo)-2-naphthol. | Bordeaux. |
| 229 | 1:2-chromium complex of 2-(2'-hydroxy-3'-amino-5'-sulphamylphenylazo)-3-sulphamyl-1-naphthol. | Bluish-violet. |
| 230 | 1:2-chromium complex of 1-(3'-sulphamylphenyl)-3-methyl-4-(2''-hydroxy-3''':5''-diaminophenylazo)-5-pyrazolone. | Reddish-brown. |
| 231 | 1:2-chromium complex of 4-methyl-2-(3':5'-diamino-2'-hydroxyphenylazo)phenol. | Bluish-brown. |
| 232 | 1:2-cobalt complex of 3:4-dimethyl-6-(3':5'-diamino-2'-hydroxyphenylazo)phenol. | Reddish-brown. |
| 233 | 1:2-cobalt complex of 6-sulphamyl-1-(3':5'-diamino-2'-hydroxyphenylazo)-2-naphthylamine. | Olive-green. |

The *1-acryloylamino-7-naphthol* used in the above examples may be obtained as follows:

40.5 parts of acryloyl chloride are added during 6 hours, with stirring, to a solution of 35.2 parts of 1-amino-7-naphthol hydrochloride in 340 parts of water, the temperature of the mixture being maintained between 0° and 5° C. by external cooling, and the mixture being maintained neutral to Congo red by the simultaneous addition of sodium acetate. The mixture is then stirred for 1 hour, 7 parts of a concentrated aqueous solution of hydrochloric acid are added and the precipitated product is filtered off and dried. The solid so obtained is stirred with chloroform and the solid is then filtered off and dried. The 1-acryloylamino-7-naphthol so obtained crystallises from toluene in the form of colourless plates which melt at 153° to 154° C.

The *2-acryloylamino-7-naphthol* used in the above examples may be obtained as follows:

28.5 parts of acryloyl chloride are added during 6 hours, with stirring, to a solution of 19.5 parts of 2-amino-7-naphthol hydrochloride in 700 parts of water, the temperature of the mixture being maintained between 15° and 20° C. by external cooling, and the mixture being maintained neutral to Congo red by the simultaneous addition of sodium acetate. The mixture is then stirred for 1 hour, acidified to Congo red with a concentrated aqueous solution of hydrochloric acid and the precipitated product is filtered off, washed with water and dried. 2-Acryloylamino-7-naphthol crystallises from a mixture of water and acetic acid in the form of grey needles which melt at 185° C. On analysis the product is found to contain 73.0% of carbon, 5.1% of hydrogen and 6.35% of nitrogen. $C_{13}H_{11}O_2N$ requires 73.2% of carbon, 5.1% of hydrogen and 6.6% of nitrogen.

The *1-(α-chloroacryloylamino)-7-naphthol* used in the above examples may be obtained as follows:

12 parts of α-chloroacryloyl chloride are added during 6 hours, with stirring, to a solution of 14.6 parts of 1-($\alpha$-chloroacryloylamino)-7-naphthol crystallises from benzene in the form of pale yellow needles which melt between 136° and 137° C. On analysis the product is found to contain 63.6% of carbon, 3.8% of hydrogen, 5.6% of nitrogen and 14.1% of chlorine. $C_{13}H_{10}O_2NCl$ requires 63.0% of carbon, 4.0% of hydrogen, 5.6% of nitrogen and 14.3% of chlorine.

The *5-acryloylaminoanthranilic acid* used in the above examples may be obtained as follows:

30.8 parts of acryloyl chloride and 85 parts of sodium acetate crystals are simultaneously added, with stirring, during 8 hours to a solution of 20.2 parts of sodium 3-amino-6-nitrobenzoate in 500 parts of water, the temperature of the mixture being maintained between 0° and 5° C. by external cooling. The mixture is then acidified to Congo red with a concentrated aqueous solution of hydrochloric acid and the 3-acryloylamino-6-nitrobenzoic acid which separates out is filtered off, washed with water and dried.

10 parts of the 3-acryloylamino-6-nitrobenzoic acid are added during 30 minutes to a mixture of 20 parts of iron filings, 2 parts of ferrous chloride and 200 parts of water which is stirred at the boil under a reflux condenser. A further 20 parts of iron filings are then added and the mixture is again stirred at the boil for a further 2 hours. An aqueous solution of sodium hydroxide is added until the mixture is alkaline to Brilliant Yellow, and the mixture is then filtered. The filtrate so obtained is acidified with acetic acid and the 5-acryloylaminoanthranilic acid which is precipitated is filtered off, washed with water and dried. The product melts at 226° C. with decomposition.

The *2-acryloylamino-4-methylphenol* used in the above examples may be obtained as follows:

22.8 parts of acryloyl chloride are added during 3½ hours, with stirring, to a solution of 16.0 parts of 2-amino-4-methylphenol hydrochloride in 200 parts of water, the temperature of the mixture being maintained between 20° and 25° C. and the mixture being maintained neutral to Congo red by the simultaneous addition of sodium acetate. The mixture is then stirred for 1 hour, made acid to Congo red by the addition of a concentrated aqueous solution of hydrochloric acid, and the precipitated product is filtered off, washed with water and dried. The 2-acryloylamino-4-methylphenol crystallises from water in the form of colourless crystals which melt at 107° C. On analysis the product is found to contain 68.0% of carbon, 5.8% of hydrogen and 7.7% of nitrogen, $C_{10}H_{11}O_2N$ requires 67.8% of carbon, 6.2% of hydrogen and 7.9% of nitrogen.

The *1-acryloylamino-4-naphthol* used in the above examples may be obtained as follows:

28.5 parts of acryloyl chloride are added during 6 hours, with stirring, to a solution of 19.5 parts of 1-amino-4-naphthol hydrochloride in 700 parts of water, the temperature being maintained at 20° C. and the mixture being maintained neutral to Congo red by the simultaneous addition of sodium acetate. The mixture is then acidified to Congo red with a concentrated aqueous solution of hydrochloric acid and the precipitated solid is filtered off, washed with water and dried. 1-acryloylamino-4-naphthol crystallises from toluene in the form of colourless crystals which melt at 184° C. On analysis the product is found to contain 73.1% of carbon, 5.0% of hydrogen and 6.4% of nitrogen. $C_{13}H_{11}O_2N$ requires 73.2% of carbon, 5.1% of hydrogen and 6.6% of nitrogen.

The *2-acryloylamino-6-naphthol* (melting point of 164° C.) and *1-acryloylamino-6-naphthol* (melting point 163° C.) used in the above examples may be obtained by the method described above for 1-acryloylamino-4-naphthol except that the 1-amino-4-naphthol hydrochloride is replaced by 2-amino-6-naphthol hydrochloride or by 1-amino-6-naphthol hydrochloride respectively.

The *1-(4'acryloylaminophenyl)-3-methyl-5-pyrazolone* used in the above examples may be obtained as follows:

17 parts of acryloyl chloride are added, with stirring, during 8 hours to a solution of 22.5 parts of 1-(4'-aminophenyl)-3-methyl-5-pyrazolone hydrochloride in 300 parts of water, the temperature being maintained between 7° and 13° C. by external cooling and the mixture being maintained neutral to Congo red by the simultaneous addition of sodium acetate. The mixture is then made just acid to Congo red by the addition of a concentrated aqueous solution of hydrochloric acid and the precipitated product is filtered off, washed with cold water and dried. 1-(4'-acryloylaminophenyl)-3-methyl-5-pyrazolone crystallises from toluene in the form of pale yellow rosettes which melt at 184° C. On analysis the product is found to contain 64.2% of carbon, 5.4% of hydrogen and 17.8% of nitrogen. $C_{13}H_{13}N_3O_2$ requires 64.2% of carbon, 5.35% of hydrogen and 17.3% of nitrogen.

The *4-(acryloylamino)acetoacetanilide* used in the above examples may be obtained as follows:

7 parts of acryloyl chloride are added during 20 minutes to a stirred mixture of 5 parts of 4-aminoacetoacetanilide hydrochloride, 10 parts of sodium acetate crystals and 50 parts of water, at a temperature of 20° C. and the resulting mixture is then stirred for a further ½ hour. The mixture is then made acid to Congo red by the addition of a concentrated aqueous solution of hydrochloric acid and the precipitated 4-(acryloylamino) acetoacetanilide is filtered off, washed with water and dried. The product melts at 185° C. with decomposition.

The *4-acryloylamino-2-aminophenol* used in the above examples may be obtained as follows:

4-acryloylamino-2-nitrophenol (of melting point 154° C.) is prepared by the method described above for 1-acryloylamino-4-naphthol except that the 19.5 parts of 1-amino-4-naphthol hydrochloride are replaced by 19 parts of 4-amino-2-nitrophenol hydrochloride.

A concentrated aqueous solution of ammonium hydroxide is added to a solution of 200 parts of ferrous sulphate crystals in 600 parts of water at a temperature of 80° C. until the mixture is alkaline to Brilliant Yellow, and the resulting mixture is added with stirring to a solution of 22 parts of 4-acryloylamino-2-nitrophenol in 3000 parts of water at a temperature of 80° C. The resulting mixture is stirred for 1 hour at a temperature of 80° C. and is then filtered. The filtrate so obtained is evaporated to dryness in vacuum and the resulting solid is stirred with 200 parts of water. The residual 4-acryloylamino-2-aminophenol is then filtered off and dried. The product crystallises from water in the form of colourless crystals which melt at 176° to 178° C.

The *1 - (3' - acryloylaminophenyl)-3-methyl-5-pyrazolone, 1 - (2'-acryloylaminophenyl)-3-methyl-5-pyrazolone* and *1-2'-methyl-5'-acryloylaminophenyl)-3-methyl-5-pyrazolone* used in the above examples may be obtained by the method described above for 1,(4'-acryloylaminophenyl)-3-methyl-5-pyrazolone, using the appropriate 1-(aminophenyl)-3-methyl-5-pyrazoline hydrochloride.

The *1-[4'-(α-chloroacryloylamino)phenyl]-3-methyl-5-pyrazolone* used in the above examples may be obtained by the method described above for 1-(4'-acryloylaminophenyl)-3-methyl-5-pyrazolone using an equivalent amount of α-chloroacryloyl chloride in place of the 17 parts of acryloyl chloride.

The *3-acryloylamino-4-methylphenol* (of melting point 137° C.) used in the above examples may be obtained by the method described above for 2-acryloylamino-4-methylphenol but starting from 3-amino-4-methylphenol hydrochloride.

The *4-(N-methylacryloylamino)-2-aminophenol* used in the above examples may be obtained as follows:

8.4 parts of 4-N-methylamino-2-nitrophenol are dissolved in 250 parts of water at 70° C. by the addition of a concentrated aqueous solution of hydrochloric acid. The resulting solution is cooled to 20° C. and 12 parts of acryloyl chloride are added, with stirring, during 2 hours at a temperature of 18° to 20° C., the mixture being maintained neutral to Congo red by the simultaneous addition of sodium acetate. The solution is then cooled to 8° C., acidified with a concentrated aqueous solution of hydrochloric acid and the precipitated solid is filtered off and washed with water. The resulting 4-(N-methylacryloylamino)-2-nitrophenol crystallises from aqueous alcohol in the form of brown plates, of melting point 111° C.

7.0 parts of the 4-(N-methylacryloylamino)-2-nitrophenol are dissolved in 400 parts of water at 90° C. A suspension of ferrous hydroxide (which is obtained by dissolving 70 parts of ferrous sulphate in 200 parts of water and making strongly alkaline with aqueous ammonium hydroxide) is then added and the resulting mixture is stirred at 80° C. for ¾ hour. The mixture is filtered at 80° C., the resulting filtrate is cooled to 0° C. and the precipitated amine is filtered off and dried. After crystallisation from water the amine melts at 134° C. On analysis the amine is found to contain 62.5% of carbon, 6.1% of hydrogen and 14.5% of nitrogen. $C_{10}H_{12}O_2N_2$ requires 62.6% of carbon, 6.26% of hydrogen and 14.6% of nitrogen.

What we claim is:
1. The metal-containing azo dyestuffs of the formula:

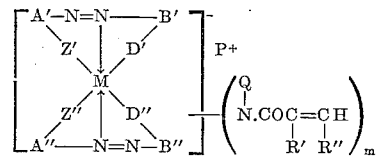

wherein
A' and A" are arylene radicals of diazo components independently selected from the class consisting of phenylene and naphthylene diazo components;

Z' and Z", which are attached to the arylene radicals A' and A" respectively in ortho position to the azo groups, are independently selected from the class consisting of —O— and —COO—;

B' and B" are the residues of coupling components independently selected from the class consisting of residues of coupling components of the phenol, naphthol, acylacetarylamide wherein said acylacetarylamide is selected from the group consisting of acetoacetamilide, acetoacet-2-, 3- and 4-methylanilide, acetoacet-2-, 3- and 4-methoxyanilide, acetoacet-2:5-dimethoxyanilide, acetoacet-2-, 3- and 4-chloroanilide, acetoacetanilide-3- and 4-sulphonamide, 3- and 4-acryloylaminoacetoacetanilide, acetoacet-4-(acetylamino) anilide and acetoacet-2-methoxy-5-methylanilide, 5-aminopyrazole, 5-pyrazolone, 2:4-dihydroxyquinoline and 2-naphthylamine 6-sulphonamide coupling components;

D' and D", which are attached to the residues of the coupling components B' and B" respectively in an adjacent position to the azo groups, are independently selected from the class consisting of —O— and —NH—;

M is a metal atom selected from the class consisting of cobalt and chromium atoms;

P is a cation selected from the group consisting of hydrogen, sodium, potassium, and ammonium cations;

Q is selected from the class consisting of hydrogen and lower alkyl;

R' and R" are independently selected from the class consisting of hydrogen and chlorine atoms;

$m$ is a positive integer not exceeding 4;

and each of the

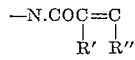

groups is directly attached to a carbon atom of an aryl ring present in A', A", B' and B" which are free from sulphonic acid and carboxylic acid groups.

2. The metal-containing azo dyestuffs of the formula:

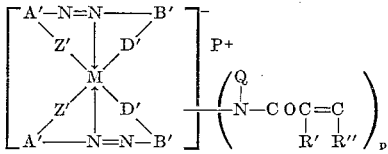

wherein
A' is an arylene radical of a diazo component selected from the class consisting of phenylene and naphthylene diazo components;

Z' which is attached to A' in ortho position to the azo group is selected from the class consisting of —O— and —COO—;

B' is the residue of a coupling component selected from the class consisting of residues of coupling components of the phenol, naphthol, acylacetarylamide wherein said acylacetarylamide is selected from the group consisting of acetoacetamilide, acetoacet-2-, 3- and 4-methylanilide, acetoacet-2-, 3- and 4-methoxyanilide, acetoacet-2:5-dimethoxyanilide, acetoacet-2-, 3- and 4-chloroanilide, and acetoacetanilide-3- and 4-sulphonamide, 3- and 4 - acryloylaminoacetoacetanilide, acetoacet-4-(acetylamino) anilide and acetoacet-2-methoxy-5-methylanilide, 5-aminopyrazole, 5-pyrazolone, 2:4-dihydroxyquinoline and 2-naphthylamine 6-sulphonamide coupling components;

D' which is attached to B' in an adjacent position to the azo group is selected from the class consisting of —O— and —NH—;

M is a metal atom selected from the class consisting of cobalt and chromium atoms;

P is a cation selected from the group consisting of hydrogen, sodium, potassium, and ammonium cations;

Q is selected from the class consisting of hydrogen and lower alkyl;

R' and R" are independently selected from the class consisting of hydrogen and chlorine atoms;

$p$ is an integer selected from 2 and 4; and each of the

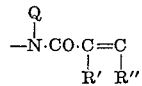

groups is directly attached to a carbon atom of an aryl ring present in A' and B', which are free from sulphonic acid and carboxylic acid groups.

3. The 1:2-chromium and 1:2-cobalt complexes of the monoazo compounds of the formula:

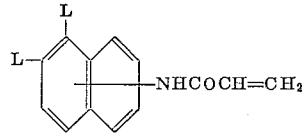

wherein one L represents a hydroxy group, and the other L represents a radical of the formula:

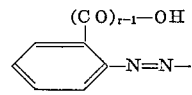

wherein $r$ is a positive integer not exceeding 2, and any substituents on the benzene ring are selected from the class consisting of chlorine, nitro, lower alkyl, lower alkoxy, lower alkylsulphonyl, hydroxy lower alkylsulphonyl, sulphamyl, N-(lower alkyl)sulphamyl, N:N-di (lower alkyl)sulphamyl, N-(hydroxy lower alkyl) sulphamyl and N:N-di(hydroxy lower alkyl)sulphamyl.

4. The 1:2-chromium and 1:2-cobalt complexes of the monoazo compounds of the formula:

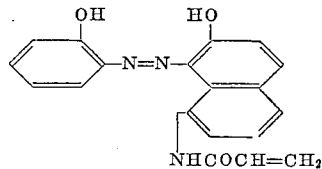

and any substituents on the benzene ring are selected from the class consisting of chlorine, nitro, lower alkyl, lower alkoxy, lower alkylsulphonyl, hydroxy lower alkylsulphonyl, sulphamyl, N-(lower alkyl) sulphamyl, N:N-di (lower alkyl) sulphamyl, N-(hydroxy lower alkyl) sulphamyl and N:N-di(hydroxy lower alkyl)sulphamyl.

5. The 1:2-chromium and 1:2-cobalt complexes of the monoazo compounds of the formula:

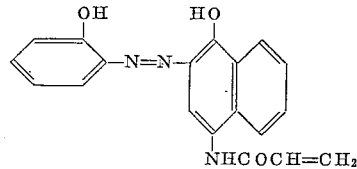

any any substituents on the benzene ring are selected from the class consisting of chlorine, nitro, lower alkyl, lower alkoxy, lower alkylsulphonyl, hydroxy lower alkylsulphonyl, sulphamyl, N-(lower alkyl)sulphamyl, N:N-di (lower alkyl)sulphamyl, N-(hydroxy lower alkyl)sulphamyl and N:N-di(hydroxy lower alkyl)sulphamyl.

6. The 1:2-chromium and 1:2-cobalt complexes of the monoazo compounds of the formula:

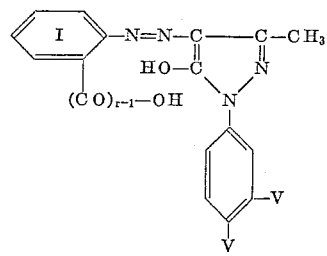

wherein r represents a positive integer not exceeding 2, one V represents a hydrogen atom and the other V represents a —NHCOCH=CH$_2$ group, and any substituents on the benzene ring I are selected from the class consisting of chlorine, nitro, lower alkyl, lower alkoxy, lower alkylsulphonyl, hydroxy lower alkylsulphonyl, sulphamyl, N - (lower alkyl)sulphamyl, N:N - di(lower alkyl)sulphamyl, N-(hydroxy lower alkyl)sulphamyl and N:N-di(hydroxy lower alkyl)-sulphamyl.

7. The 1:2-chromium and 1:2-cobalt complexes of the monoazo compounds of the formula:

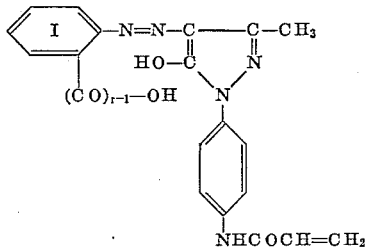

wherein r reprsents a positive integer not exceeding 2, and substituents on the benzene ring I are selected from the class consisting of hydrogen chlorine, nitro, lower alkyl, lower alkoxy, lower alkylsulphonyl, hydroxy lower alkylsulphonyl, sulphamyl, N-(lower alkyl)sulphamyl, N:N-di(lower alkyl)sulphamyl, N-(hydroxy lower alkyl)sulphamyl and :N-di(hydroxy lower alkyl)sulphamyl.

References Cited by the Examiner

UNITED STATES PATENTS

| | | | |
|---|---|---|---|
| 2,610,175 | 9/1952 | Widmer et al. | 260—145 |
| 2,673,199 | 3/1954 | Widmer et al. | 260—145 |
| 2,674,515 | 4/1954 | Widmer et al. | 260—145 XR |
| 2,938,896 | 5/1960 | Strobel | 260—151 |

FOREIGN PATENTS 565,447   9/1958   Belgium.

OTHER REFERENCES

Wegmann, Textile Praxis, October 1958, pp. 1056–1061.

CHARLES B. PARKER, *Primary Examiner.*